(12) United States Patent
Ishimori

(10) Patent No.: US 10,001,560 B2
(45) Date of Patent: Jun. 19, 2018

(54) RADAR APPARATUS

(71) Applicant: FUJITSU TEN LIMITED, Kobe-shi, Hyogo (JP)

(72) Inventor: Hiroyuki Ishimori, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 373 days.

(21) Appl. No.: 14/692,046

(22) Filed: Apr. 21, 2015

(65) Prior Publication Data
US 2015/0309171 A1    Oct. 29, 2015

(30) Foreign Application Priority Data

Apr. 25, 2014  (JP) .................. 2014-091105

(51) Int. Cl.
| | |
|---|---|
| G01S 13/93 | (2006.01) |
| B60W 30/09 | (2012.01) |
| G01S 7/41 | (2006.01) |
| G01S 13/34 | (2006.01) |
| G01S 13/72 | (2006.01) |

(52) U.S. Cl.
CPC .......... *G01S 13/931* (2013.01); *B60W 30/09* (2013.01); *G01S 7/41* (2013.01); *G01S 13/345* (2013.01); *G01S 13/726* (2013.01); *G01S 7/415* (2013.01); *G01S 2013/9321* (2013.01); *G01S 2013/9346* (2013.01); *G01S 2013/9353* (2013.01); *G01S 2013/9375* (2013.01)

(58) Field of Classification Search
CPC ............................. G01S 13/931; B60W 30/09
USPC ...................................................... 342/70–72
See application file for complete search history.

(56) References Cited

U.S. PATENT DOCUMENTS

| | | | | |
|---|---|---|---|---|
| 6,311,123 | B1* | 10/2001 | Nakamura | B60K 31/0008 123/352 |
| 6,377,205 | B1* | 4/2002 | Eckersten | G01S 7/412 342/27 |
| 6,438,491 | B1* | 8/2002 | Farmer | B60W 30/16 340/435 |
| 7,327,855 | B1* | 2/2008 | Chen | G01S 13/931 382/104 |
| 7,592,945 | B2* | 9/2009 | Colburn | G01C 9/00 342/118 |

(Continued)

FOREIGN PATENT DOCUMENTS

| | | |
|---|---|---|
| JP | H08-339500 A | 12/1996 |
| JP | 2003-270348 A | 9/2003 |

(Continued)

*Primary Examiner* — Marcus E Windrich
(74) *Attorney, Agent, or Firm* — Oliff PLC

(57) ABSTRACT

A radar apparatus includes a signal processor configured to: derive the target data set of the target, in a predetermined time cycle, based on a reception signal acquired by receiving a reflection wave from the target; detect, based on the target data set, a side wall along a current lane in which the host vehicle is traveling; determine whether or not there is a continuity between a previous target data set and a latest target data set, and in a case where there is no continuity between the previous target data set and the latest target data set, perform "extrapolation;" determine based on a frequency of the "extrapolation" whether or not the target associated with the target data set is an upper object overhead of the vehicle and with which the vehicle cannot collide.

12 Claims, 17 Drawing Sheets

(56) References Cited

U.S. PATENT DOCUMENTS

| | | | |
|---|---|---|---|
| 7,877,209 B2* | 1/2011 | Harris | B60R 9/04 |
| | | | 318/445 |
| 8,077,075 B2* | 12/2011 | Randler | G01S 13/345 |
| | | | 342/104 |
| 8,674,873 B2* | 3/2014 | Shibata | G01S 13/345 |
| | | | 342/118 |
| 9,297,892 B2* | 3/2016 | Smith | B60K 31/0008 |
| 9,575,170 B2* | 2/2017 | Kurono | G01S 7/354 |
| 9,618,607 B2* | 4/2017 | Asanuma | G01S 13/345 |
| 2003/0011509 A1* | 1/2003 | Honda | G01S 7/412 |
| | | | 342/70 |
| 2011/0221628 A1* | 9/2011 | Kamo | G01S 7/295 |
| | | | 342/70 |

FOREIGN PATENT DOCUMENTS

| | | |
|---|---|---|
| JP | 2009-063440 A | 3/2009 |
| JP | 2009-133780 A | 6/2009 |
| JP | 2012-242937 A | 12/2012 |

* cited by examiner

RADAR APPARATUS

BACKGROUND OF THE INVENTION

Field of the Invention

The invention relates to a technology for acquiring target information about a target.

Description of the Background Art

Conventionally, a radar apparatus that acquires information about an object (target) (hereinafter referred to as "target information") near a host vehicle is used, for example, for a vehicle control system that controls the host vehicle to follow a preceding vehicle traveling ahead of the host vehicle and for a vehicle control system that controls the host vehicle so as to reduce the impact of a collision with the object ahead of the host vehicle.

Such a radar apparatus transmits a transmission wave and acquires a set of target data (hereinafter referred to as "target data set") of the target periodically at a predetermined interval, based on a signal acquired by receiving a reflection wave reflected by the target such as another vehicle. Moreover, the radar apparatus determines whether or not a latest target data set has a temporal continuity with a previously-acquired target data set. In a case where the radar apparatus determines that there is no temporal continuity between the previously-acquired target data set and the latest target data set, the radar apparatus performs an extrapolation that uses a set of prediction data (hereinafter referred to as "prediction data set") generated based on the previously-acquired target data set.

In some cases, there is a stationary upper object, such as a lighting device and an overpass, above a lane in which the host vehicle is currently traveling (hereinafter referred to as "current lane). Since the host vehicle does not collide with such an upper object, the vehicle control system does not need to control the host vehicle to prevent a collision with the upper object. Generally, the transmission wave does not reach an upper object close to the host vehicle. Therefore, the extrapolation is frequently performed for the target data set of the upper object. Thus, it is possible to determine based on the frequency of the extrapolation whether or not a target associated with an object data set is an upper object and then to exclude the target data set of the upper object from target data sets to be processed.

However, depending on an environment and the like in which the host vehicle is traveling, the radar apparatus does not correctly determine that a target associated with a target data set is an upper object so that there is a possibility that the vehicle control system wrongly controls the host vehicle based on the target data set of the upper object. For example, in a case where a side wall extends along the current lane in which the host vehicle is traveling, the radar apparatus sometimes wrongly determines that there is a temporal continuity between the target data set of the upper object and a target data set of the side wall. As a result, there is a possibility that the target associated with the target data set is not determined as an upper object.

SUMMARY OF THE INVENTION

According to one aspect of the invention, a radar apparatus acquires a target data set of a target near a host vehicle. The radar apparatus includes a signal processor configured to: derive the target data set of the target, in a predetermined time cycle, based on a reception signal acquired by receiving a reflection wave from the target; detect, based on the target data set, a wall along a current lane in which the host vehicle is traveling; determine whether or not there is a continuity between a previous target data set and a latest target data set, and in a case where there is no continuity between the previous target data set and the latest target data set, use a prediction target data set derived based on the previous target data set; and determine, based on a frequency of use of the prediction target data set, whether or not the target associated with the target data set is an upper object overhead of the vehicle and with which the vehicle cannot collide, wherein in a case where (i) it is determined that there is the continuity between the latest target data set of the target and the previous target data set of a stationary object in the current lane and (ii) the target associated with the latest target data set is in a range of the wall, the signal processor uses the prediction data set.

In a case where it is determined that there is the continuity between the latest target data set of the target and the previous target data set and where the target associated with the latest target data set is in the range of the wall, the radar apparatus uses the prediction data set. Thus, a frequency of use of the prediction data set for the target data set of an upper object can be increased and the target associated with the target data set can be determined accurately as the upper object.

According to another aspect of the invention, the signal processor is further configured to: determine that, in a case where (a) the target associated with the target data set is the stationary object that has newly appeared and (b) there is another vehicle within a predetermined distance in front of the target, the target is the upper object.

In the case where the target associated with the target data set is the stationary object that has newly appeared and where there is another vehicle within the predetermined distance in front of the target, the radar apparatus determines the target as the upper object. Thus, the target associated with the target data set can be more accurately determined as the upper object.

According to another aspect of the invention, the signal processor is further configured to: in a case where: (1) the target associated with the target data set is the stationary object; (2) a time to collision of the host vehicle with the target is equal to or less than a threshold; and (3) there is another vehicle between the target and the host vehicle, change a condition that is used to determine whether or not the target associated with the target data set is the upper object so as to increase a possibility that the target is determined as the upper object.

In the case where: (1) the target associated with the target data set is a stationary object; (2) the time to collision of the host vehicle with the target is equal to or less than the threshold; and (3) there is another vehicle between the target and the host vehicle, the radar apparatus increases the possibility that the target is determined as the upper object. Therefore, the target associated with the target data set can be more accurately determined as the upper object.

Therefore, an object of the invention is to accurately determine a target associated with a target data set as an upper object.

These and other objects, features, aspects and advantages of the invention will become more apparent from the following detailed description of the invention when taken in conjunction with the accompanying drawings.

DESCRIPTION OF THE EMBODIMENTS

Embodiments of the invention will be hereinafter described with reference to the drawings.

1. First Embodiment

1-1. Configuration

Figure 1:
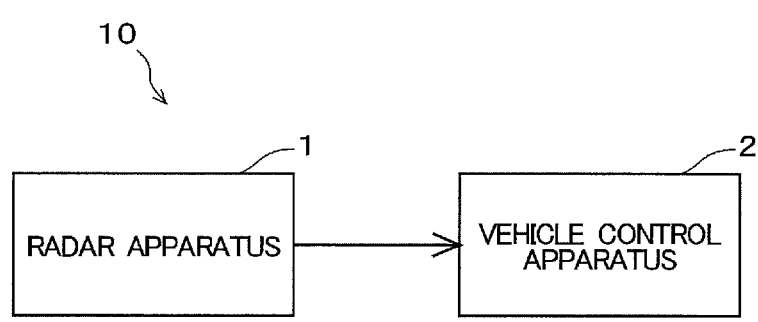
FIG. 1 illustrates a configuration of a vehicle control system.

FIG. 1 illustrates a configuration of a vehicle control system 10 in this embodiment. The vehicle control system 10 is mounted on a vehicle, such as a car. The vehicle on which the vehicle control system 10 is mounted is hereinafter referred to as "host vehicle." Moreover, a traveling direction in which the host vehicle is traveling is also referred to as "front direction" and a direction opposite to the traveling direction is referred to as "back direction." As shown in FIG. 1, the vehicle control system 10 includes a radar apparatus 1 and a vehicle control apparatus 2.

The radar apparatus 1 acquires a target data set of a target near the host vehicle. The radar apparatus 1 in this embodiment acquires the target data set of the target, such as another vehicle ahead of the host vehicle and a stationary object, using FMCW (Frequency Modulated Continuous Wave). The radar apparatus 1 derives the target data set including parameters, such as a distance (m) from the host vehicle to the target in the traveling direction of the host vehicle (hereinafter, referred to as "longitudinal distance"), a relative speed (km/h) of the target to the host vehicle, and a distance (m) from the host vehicle to the target in a left-right direction of the host vehicle (hereinafter, referred to as "lateral distance"), and then outputs the derived target data set to the vehicle control apparatus 2. As for the lateral distance, a center in the left-right direction of the host vehicle is defined as 0 (zero). A distance on a right side of the host vehicle is expressed as a positive value and a distance on a left side of the host vehicle is expressed as a negative value.

The vehicle control apparatus 2 is connected to a brake and the like of the host vehicle and controls the host vehicle based on the target data set output from the radar apparatus 1. In a case where an obstacle, such as a parked vehicle or a stationary object, exists ahead of the host vehicle, the vehicle control apparatus 2 controls the brake and the like of the host vehicle to reduce an impact of a collision with the obstacle. Thus, the vehicle control system 10 of this embodiment functions as a collision impact reducing braking system.

Figure 2:
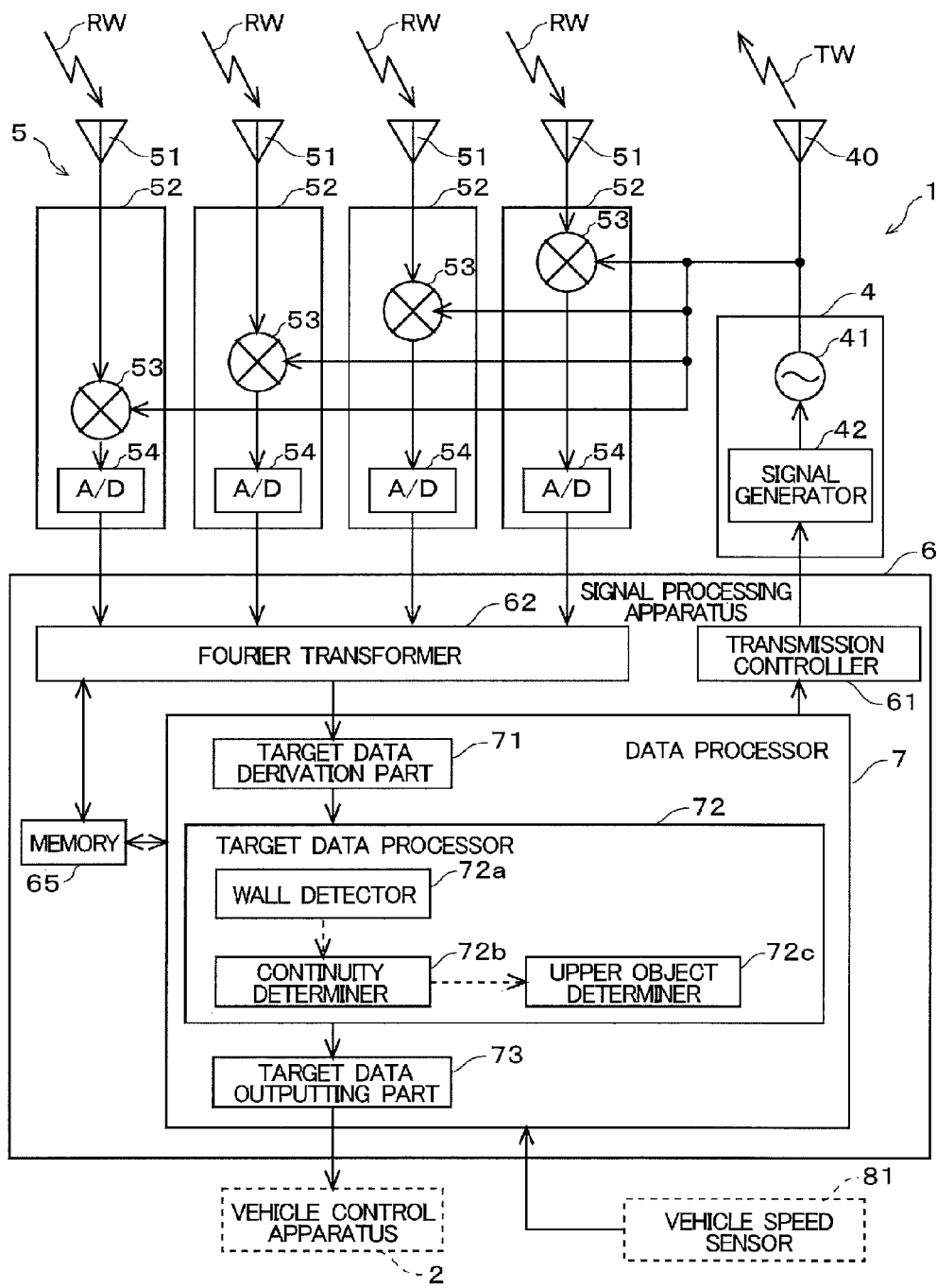
FIG. 2 illustrates a configuration of a radar apparatus in a first embodiment.

FIG. 2 illustrates a configuration of the radar apparatus 1. The radar apparatus 1 mainly includes a transmitter 4, a receiver 5 and a signal processing apparatus 6.

The transmitter 4 includes an oscillator 41 and a signal generator 42. The signal generator 42 generates a modulation signal of which voltage changes in a triangular waveform, and provides the signal to the oscillator 41. The oscillator 41 modulates frequency of a continuous wave signal based on the modulation signal generated by the signal generator 42 to generate a transmission signal of which frequency changes as time passes, and then outputs the generated transmission signal to a transmission antenna 40.

The transmission antenna 40, based on the transmission signal output by the oscillator 41, outputs a transmission wave TW outside the host vehicle. The transmission wave TW output by the transmission antenna 40 is a FMCW of which frequency changes up and down in a predetermined cycle. Once being reflected by a target, such as another vehicle, the transmission wave TW output from the transmission antenna 40 in the front direction of the host vehicle changes into a reflection wave RW.

The receiver 5 includes: plural receiving antennas 51 that form an array antenna; and plural individual receivers 52 connected to the plural receiving antennas 51. In this embodiment, the receiver 5 includes, for example, the four receiving antennas 51 and the four individual receivers 52. The four individual receivers 52 correspond to the four receiving antennas 51, respectively. Each of the receiving antennas 51 acquires a reception signal by receiving the reflection wave RW from the target and each of the individual receivers 52 processes the reception signal acquired by the corresponding receiving antenna 51.

Each of the individual receivers' 52 includes a mixer 53 and an A/D converter 54. After the reception signal acquired by each of the receiving antennas 51 is amplified by a low noise amplifier (not illustrated), the amplified reception signal is sent to the mixer 53. The transmission signal is input to the mixer 53 from the oscillator 41 of the transmitter 4, and then the transmission signal and the reception signal are mixed by the mixer 53. Thus a beat signal is generated. The beat signal represents a beat frequency that is a frequency difference between the transmission signal and the reception signal. After the beat signal generated by the mixer 53 is converted into a digital signal by the A/D converter 54, the digital beat signal is output to the signal processing apparatus 6.

The signal processing apparatus 6 includes a microcomputer that has a CPU, a memory 65, etc. The signal processing apparatus 6 stores various data for calculation in the memory 65, a storage device. An example of the memory 65 is a RAM. The signal processing apparatus 6 includes a transmission controller 61, a Fourier transformer 62 and a data processor 7 as functions implemented by software of the microcomputer. The transmission controller 61 controls the signal generator 42 of the transmitter 4.

The Fourier transformer 62 performs fast Fourier transformation (FFT) of the beat signal output from each of the plural individual receivers 52. Thus, the Fourier transformer 62 transforms the beat signal generated from the reception signal received by each of the plural receiving antennas 51 into a frequency spectrum that is data of a frequency range. The frequency spectrum acquired by the Fourier transformer 62 is input to the data processor 7.

The data processor 7 performs a target data acquisition process to acquire the target data set of the target existing ahead of the host vehicle, based on the frequency spectrum of the reception signal received by each of the plural receiving antennas 51. The data processor 7 outputs the acquired target data set to the vehicle control apparatus 2. The data processor 7 receives information from a vehicle speed sensor 81 and other sensors provided to the host vehicle. Thus, the data processor 7 uses various information output from those sensors, such as a vehicle speed of the host vehicle output from the vehicle speed sensor 81, for a process.

As shown in FIG. 2, the data processor 7 includes a target data derivation part 71, a target data processor 72 and a target data outputting part 73, as major functions.

The target data derivation part 71 derives the target data set of the target based on the frequency spectrum acquired by the Fourier transformer 62. The target data processor 72 performs various processes of the derived target data set, for example, a continuity determination process. The target data outputting part 73 outputs the processed target data set to the vehicle control apparatus 2. Moreover, the target data processor 72 includes a wall detector 72a, a continuity determiner 72b and an upper object determiner 72c as subfunctions. Those functions will be described later.

1-2. Method of Deriving Parameters of Target Data Set

Figure 3:
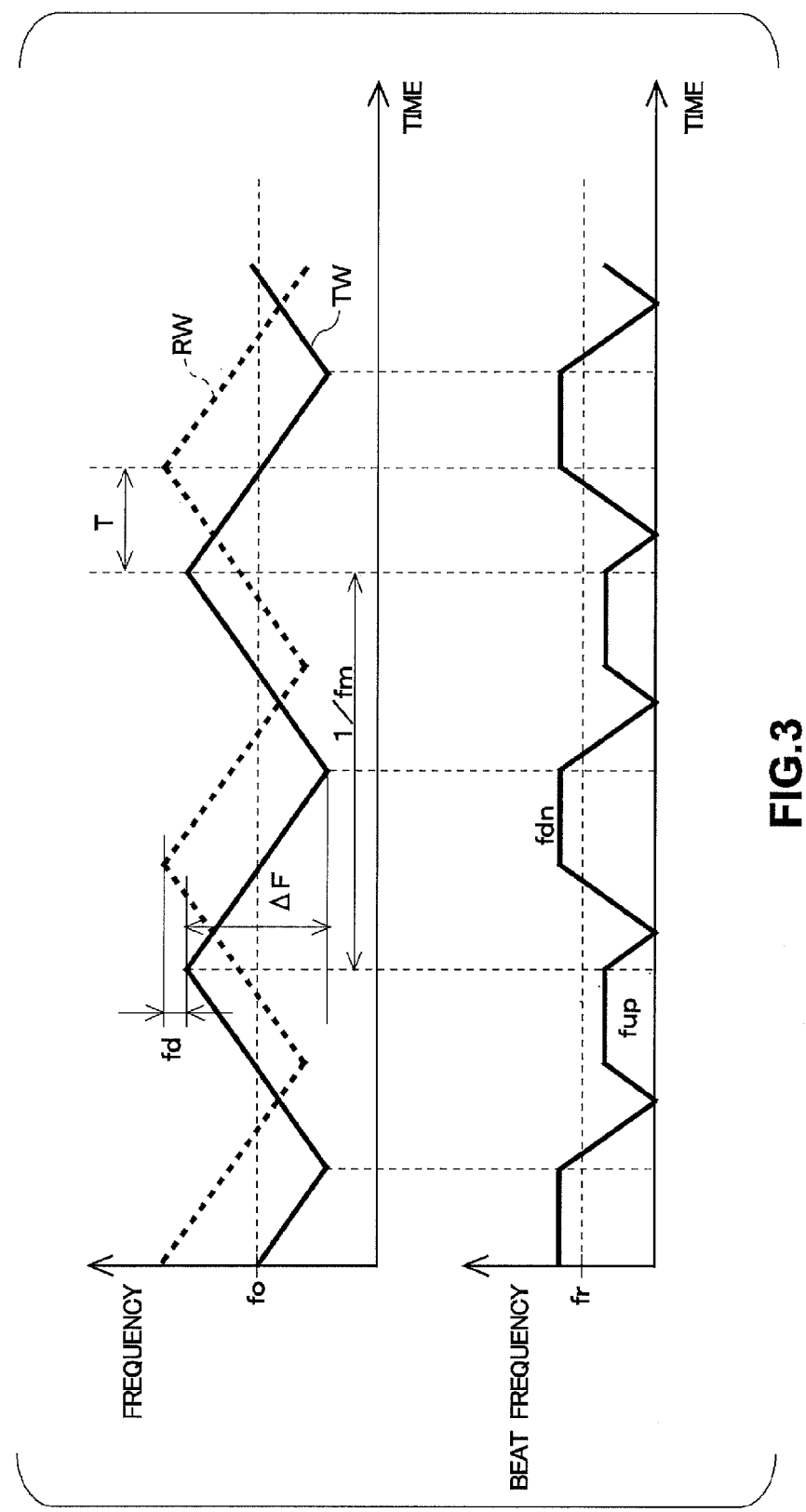
FIG. 3 illustrates a relation between a transmission wave and a reflection wave.

Next described is a method (theory) that is used by the radar apparatus 1 to derive the parameters (the longitudinal distance, relative speed and the lateral distance) of the target data sets. FIG. 3 illustrates a relation between the transmission wave TW and the reflection wave RW. To simplify an explanation, the reflection wave RW in FIG. 3 is a reflection wave reflected by one ideal target. In FIG. 3, the transmission wave TW is shown in a solid line, and the reflection wave RW is shown in a dashed line. In an upper figure of FIG. 3, a horizontal axis represents time and a vertical axis represents frequency.

As shown in FIG. 3, the transmission wave TW is a continuous wave of which frequency goes up and down from a predetermined center frequency in a predetermined cycle. The frequency of the transmission wave TW linearly changes with time. Hereinafter, a period in which the frequency of the transmission wave TW goes up is referred to as "up period," and a period in which the frequency goes down is referred to as "down period." Moreover, the center frequency of the transmission wave TW is referred to as a center frequency fo, a range (amount) of the frequency change of the transmission wave TW is as a frequency change range ΔF, and a reciprocal of one up-down cycle of the frequency of the transmission wave TW is as a reciprocal fm.

Since the reflection wave RW is the transmission wave TW reflected by the target, the reflection wave RW, like the transmission wave TW, is also a continuous wave of which frequency goes up and down from a predetermined center frequency in the predetermined cycle. However, the reflection wave RW is delayed by a time T from the transmission wave TW. The time lag T depends on a distance (longitudinal distance) R of the target to the host vehicle and is expressed in a formula 1 below, where c is a speed of light (a speed of an electrical wave).

$$T = \frac{2 \cdot R}{c} \qquad \text{[Formula 1]}$$

Due to the Doppler effect, a frequency shift of a frequency fd is generated to the reflection wave RW in comparison with the transmission wave TW and the frequency fd depends on a relative speed V of the target relative to the host vehicle.

As described above, the frequency shift is generated to the reflection wave RW in comparison with the transmission wave TW, depending on the relative speed of the target, in addition to the time lag, depending on the longitudinal distance of the target. Thus, as shown in a lower figure of FIG. 3, a beat frequency (frequency difference between the transmission wave TW and the reflection wave RW) of the beat signal generated by the mixer 53 in the up period is different from a beat frequency of the beat signal in the down period. Hereinafter, the beat frequency in the up period is referred to as up-beat frequency fup, and the beat frequency in the down period is as down-beat frequency fdn.

Assuming a relative speed of the target is "0" (where there is no frequency shift caused due to the Doppler effect), a beat frequency fr is expressed in a formula 2 below.

$$fr = \frac{fup + fdn}{2} \qquad \text{[Formula 2]}$$

The beat frequency fr is a value depending on the time lag T that is expressed in the formula 1. Thus, the longitudinal distance R of the target is derived from a formula 3 below, by use of the beat frequency fr.

$$R = \frac{c}{4 \cdot \Delta F \cdot fm} fr \qquad \text{[Formula 3]}$$

Moreover, the shifted frequency fd due to the Doppler effect is expressed in a formula 4 below.

$$fd = \frac{fup - fdn}{2} \qquad \text{[Formula 4]}$$

The relative speed V of the target is derived from a formula 5 below, by use of the derived shifted frequency fd.

$$V = \frac{c}{2 \cdot fo} fd \qquad \text{[Formula 5]}$$

In the description above, the longitudinal distance and the relative speed of the one ideal target are derived. However, practically, the radar apparatus 1 receives the reflection waves RW simultaneously from a plurality of targets existing ahead of the host vehicle. Therefore, information corresponding to each of the plurality of targets is included in the frequency spectrum generated by the Fourier transformer 62 of transforming the beat signal generated from the reception signal received by each of the plural receiving antennas 51.

Figure 4:
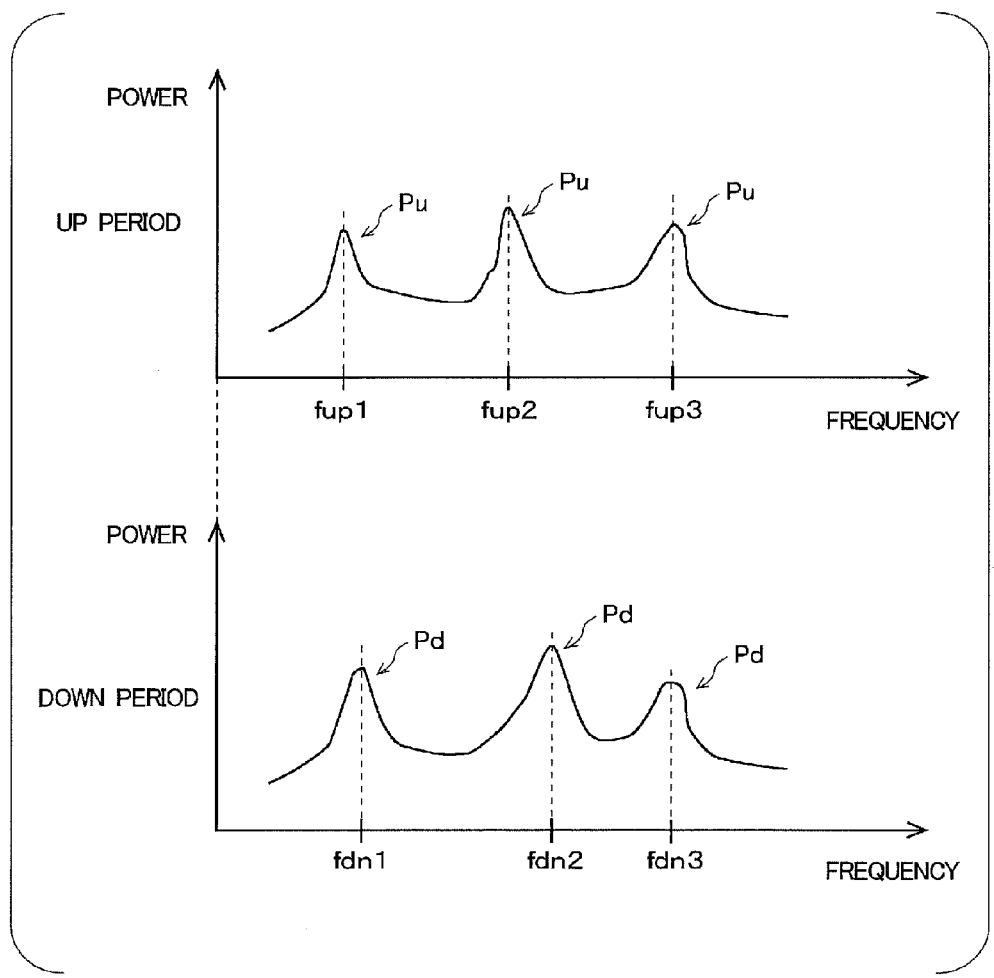
FIG. 4 illustrates examples of a frequency spectrum.

FIG. 4 illustrates examples of the frequency spectrum. An upper figure of FIG. 4 illustrates a frequency spectrum in the up period (hereinafter referred to as "up-frequency spectrum"), and a lower figure of FIG. 4 illustrates a frequency spectrum in the down period (hereinafter referred to as "down-frequency spectrum"). In FIG. 4, each of horizontal axes represents frequency, and each of vertical axes represents power of a signal.

The up-frequency spectrum in the upper figure of FIG. 4 has peaks Pu at three frequencies fup1, fup2 and fup3, respectively. The down-frequency spectrum in the lower figure of FIG. 4 has peaks Pd at three frequencies fdn1, fdn2 and fdn3, respectively.

In a case where a relative speed of a target is not considered, a frequency of a peak in such a frequency spectrum corresponds to a longitudinal distance of the target. For example, the up-frequency spectrum of FIG. 4 shows that there are three targets at longitudinal distances corresponding to the three frequencies fup1, fup2 and fup3 of the three peaks Pu.

Therefore, the target data derivation part 71 (refer to FIG. 2) extracts, from the up-frequency spectrum and the down-frequency spectrum, the frequencies of the peaks Pu and the peaks Pd that have powers greater than a predetermined threshold. The frequency extracted as described above is hereinafter referred to as "peak frequency."

The up-frequency spectrum and the down-frequency spectrum as shown in FIG. 4 are obtained based on the reception signal received by one receiving antenna 51. Thus, the Fourier transformer 62 derives an up-frequency spectrum and a down-frequency spectrum like the frequency spectrums shown in FIG. 4, based on each of the reception signals received by the four individual receiving antennas 51.

Since the four receiving antennas 51 receive the reflection waves RW reflected by same targets, peak frequencies extracted from one of the frequency spectrums are the same as peak frequencies extracted from the other frequency spectrums. However, since the four receiving antennas 51 are located at different positions from one another, phases of the reflection waves RW received by the four receiving antennas 51 are different from one another. Thus, phases of the reception signals having the same peak frequencies are different for each of the receiving antennas 51.

Moreover, in a case where plural targets exist at a same longitudinal distance, a peak frequency of the signal (hereinafter referred to as "peak signal") in the frequency spectrum includes information about the plural targets. Therefore, in a direction calculation process, the target data derivation part 71 separates the information about the plural targets included in the peak signal (corresponding to the same longitudinal distance), into information about each of the plural targets, and then estimates respective angles of the plural targets. The target data derivation part 71 estimates the angles of the plural targets based on phase information of the reception signals having the same peak frequencies in all of the frequency spectrums generated based on the reception signals received by the four receiving antennas 51.

A well-known angle estimation method, such as ESPRIT, MUSIC and PRISM, is used as a method of estimating an angle of a target as described above. Thus, the target data derivation part 71 derives the plural angles and powers of the signal (signal power) at the plural angles from the peak signal.

Figure 5:
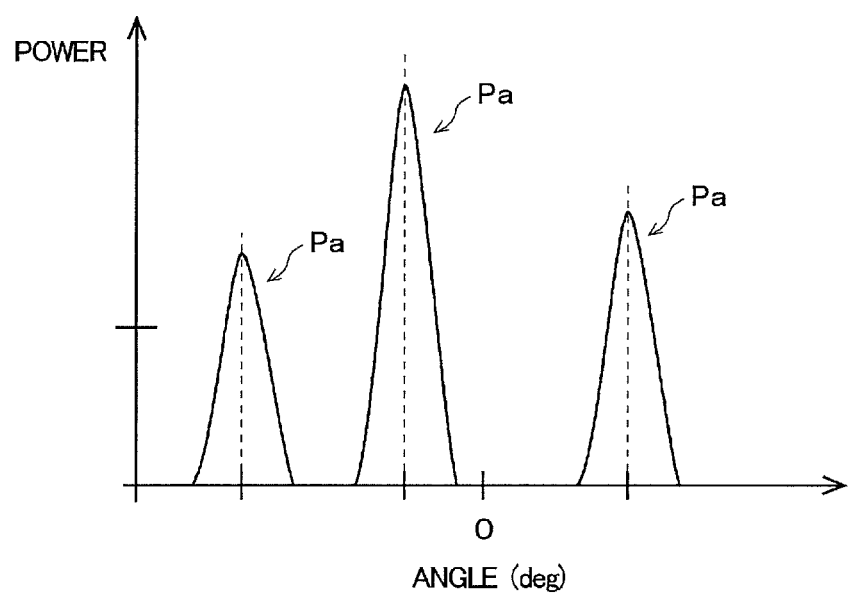
FIG. 5 illustrates examples of peak angles.

FIG. 5 is a conceptual illustration of an angle spectrum of the angles estimated in the direction calculation process. In FIG. 5, a horizontal axis represents angle (degree), and a vertical axis represents signal power. A peak Pa in the angle spectrum shown in FIG. 5 shows an angle estimated in the direction calculation process. The angle estimated in the direction calculation process is hereinafter referred to as "peak angle." As described above, plural peak angles concurrently derived from one peak signal show angles of plural targets existing at a same distance (longitudinal distance corresponding to the peak frequency).

The target data derivation part 71 derives peak angles, as described above, from all peak signals in the up-frequency spectrum and the down-frequency spectrum.

In the process described above, the target data derivation part 71 derives data sets of the periods (hereinafter referred to as "period data set") corresponding to each of the plural targets existing ahead of the host vehicle. Each of the period data sets includes parameters of the foregoing peak frequency, peak angle and signal power. The data processor 7 derives the period data sets of the up period and the down period (hereinafter referred to respectively as "up-period data set" and "down-period data set").

Moreover, the target data derivation part 71 pairs one of the derived up-period data sets with one of the derived down-period data sets in a pairing process. The target data derivation part 71 pairs the up-period data set with the down-period data set based on the parameters (peak frequency, peak angle, and signal power). The target data derivation part 71 pairs the up-period data set with the down-period data set that are associated with a same target, by pairing two period data sets having similar parameters. Thus, the target data derivation part 71 derives a target data set of each of the plural targets existing ahead of the host vehicle. Such a target data set obtained by pairing the two period data sets is also referred to as "pair data set."

The target data derivation part 71 derives the parameters (longitudinal distance, relative speed and lateral distance) of the target data set, using the parameters of the two period data sets, the up-period data set and the down-period data set, which are used to derive the target data set (pair data set).

The target data derivation part 71 uses a peak frequency in the up period as the foregoing frequency fup and a peak frequency in the down period as the foregoing frequency fdn. The target data derivation part 71 calculates the longitudinal distance R of the target, using the foregoing formulae 2 and 3, and the relative speed V of the target, using the foregoing formulae 4 and 5.

Further, the target data derivation part 71 calculates an angle θ of the target from a formula 6 below, where θup is a peak angle of the up period (hereinafter referred to as "up-peak angle") and where θdn is a peak angle of the down period (hereinafter referred to as "down-peak angle"). Then, the target data derivation part 71 obtains a lateral distance of the target by calculation of trigonometric function, based on the angle θ and the longitudinal distance R of the target.

$$\theta = \frac{\theta up + \theta dn}{2} \quad \text{[Formula 6]}$$

1-3. Target Data Acquisition Process

Figure 6:
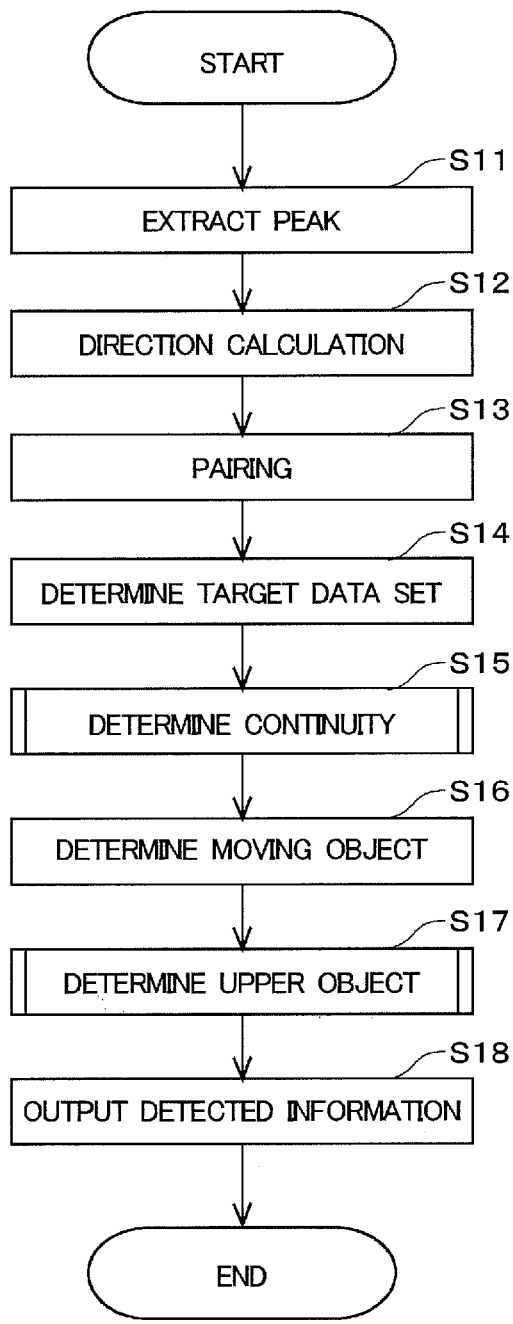
FIG. 6 illustrates a flow of a target data acquisition process.

Next described is an entire flow of the target data acquisition process where the data processor 7 derives the target data set and then outputs the derived target data set to the vehicle control apparatus 2. FIG. 6 illustrates the entire flow of the target data acquisition process. The data processor 7 repeats the target data acquisition process shown in FIG. 6 in a predetermined time cycle (e.g., 1/20 second cycle).

Before a start of the target data acquisition process, the data processor 7 receives from the Fourier transformer 62 the up-frequency spectrums and the down-frequency spectrums generated based on the reception signals received by the four receiving antennas 51.

First, the target data derivation part 71 extracts peak frequencies from the frequency spectrums (a step S11). The target data derivation part 71 extracts, as peak frequencies from the frequency spectrums, frequencies corresponding to peaks that have powers greater than the predetermined threshold.

Next, in the direction calculation process, the target data derivation part 71 estimates angles of targets associated with peak signals of the extracted peak frequencies. The target data derivation part 71 derives a peak angle and a signal power of each of the plural targets existing at a same longitudinal distance (a step S12).

Thus, the target data derivation part 71 derives the period data sets of the plural targets existing ahead of the host vehicle. The target data derivation part 71 derives the up-period data sets and the down-period data sets, each of which includes parameters of the peak frequency, the peak angle, and the signal power.

Next, the target data derivation part 71 pairs the up-period data sets with the down-period data sets in the paring process (a step S13). The target data derivation part 71 pairs each of the up-period data sets with one of the down-period data sets that has the parameters (the peak frequency, the peak angle, and the signal power) similar to the parameters of the up-period data set, based on calculation, for example, that uses Mahalanobis distances.

Once pairing the up-period data sets with the down-period data sets, the target data derivation part 71 derives the pair data sets based on the up-period data sets and the down-period data sets. The target data derivation part 71 derives the parameters (longitudinal distance, relative speed and lateral distance) of each of the derived pair data sets, using the calculation described above.

Next, the target data derivation part 71 determines the target data sets of the plural targets among the derived pair data sets (a step S14). Noise and other unnecessary data are included in the pair data sets derived by the target data derivation part 71. Therefore, the target data derivation part 71 determines, as the target data sets, only the pair data sets of the plural targets among the derived pair data sets.

The target data derivation part 71 associates, based on the parameters, the derived pair data sets with previously-determined target data sets. The target data derivation part 71 associates the pair data sets with previously-determined target data sets that have the parameters (longitudinal distance, relative speed and lateral distance) similar to the parameters of the pair data sets. Then, the target data derivation part 71 determines, as the target data sets of the targets, the pair data sets associated with the previously-determined target data sets.

Moreover, a target data set of a newly detected target is included among the pair data sets not associated with the previously-determined target data sets (hereinafter referred to as "non-associated pair data set"). Therefore, in a case where the non-associated pair data set is continuously paired with a previously-determined target data set in next target data acquisition processes for a predetermined time (e.g. three times) or more, the target data derivation part 71 determines the non-associated pair data set as a target data set of the newly detected target.

The target data derivation part 71 derives the target data sets of targets near the host vehicle in the process described above. Since the target data acquisition process is repeated in the predetermined time cycle (e.g., 1/20 second cycle), the target data derivation part 71 derives the target data sets of the target in the predetermined time cycle.

Each of the target data sets includes the parameters, such as the longitudinal distance, the relative speed and the lateral distance. In addition, various process variables that are used for processes are set to the target data sets. The process variables are, for example, "a new object flag," "a moving object flag," "a preceding vehicle flag," "an upper object flag" and "a presence counter." The new object flag represents whether or not a target associated with the target data set is a newly detected target. The target data derivation part 71 turns on the new object flag for the target data set of the newly detected target. Other variables will be described later.

Next, the continuity determiner 72b of the target data processor 72 (refer to FIG. 2) performs the continuity determination process (a step 15). The continuity determiner 72b determines whether or not there is a temporal continuity (hereinafter referred also to simply as "continuity") between a target data set derived last (hereinafter referred to as "latest target data set") and a target data set derived previously (hereinafter referred to as "previous target data set"). In other word, the continuity determiner 72b determines whether or not the latest target data set is associated with a same target with which the previous target data set is associated. In a case where the continuity determiner 72b determines there is no temporal continuity between the latest target data set and the previous target data set, the continuity determiner 72b performs an "extrapolation" that is a process of using a prediction data set that is derived based on the previous target data set.

Moreover, the continuity determiner 72b performs a filtering process of smoothing, in a direction in which the time advances, parameters (longitudinal distance, relative speed and lateral distance) of two target data sets between which there is the temporal continuity. The target data set derived in the filtering process described above is also referred to as "filter data set," in distinction from the pair data set that represents an instantaneous value. The continuity determination process will be described later in detail.

Next, the target data processor 72 performs a moving object determination process to set the moving object flag and the preceding vehicle flag to the target data sets (a step S16). The moving object flag represents whether or not a target associated with the target data set is moving. The preceding vehicle flag represents whether or not a target associated with the target data set has traveled before, even once, in a same direction as the traveling direction of the host vehicle. The moving object flag is set in each target data acquisition process and represents a current state of the target on a real-time basis. On the other hand, a value of the preceding vehicle flag is sequentially passed on to series of the target data sets among which there is the temporal continuity (data sets of a same target).

Based on the relative speed of the target data set and the speed of the host vehicle acquired from the vehicle speed sensor 81, the target data processor 72 derives a ground speed (absolute speed) and a traveling direction of the target associated with the target data set. Then the target data processor 72 sets the moving object flag and the preceding vehicle flag, based on the derived ground speed and the derived traveling direction, to each of the target data sets.

Next, the upper object determiner 72c of the target data processor 72 (refer to FIG. 2) performs an upper object determination process of determining whether or not the target associated with each of the target data sets is an upper object overhead of the host vehicle and with which the host vehicle cannot collide (a step S17). For example, the host vehicle does not collide with the upper object (upper structure) that is a stationary object existing above the current lane of the host vehicle, such as a lighting device and an overpass. Therefore, the vehicle control system 10 does not have to control the brake and the like of the host vehicle to avoid the upper objects.

Therefore, the upper object determiner 72c determines whether or not the target associated with each of the target data sets is the upper object. In a case where the target is the upper object, the upper object determiner 72c turns on the upper object flag of the target data set of the target. The upper object determiner 72c determines based on a frequency of "extrapolation" (frequency of using the prediction data set) in the previous continuity determination processes (the step S15) whether or not the target associated with each of the target data sets is the upper object. The upper object determination process will be described later in detail.

Next, the target data outputting part 73 outputs the target data sets derived as described above, to the vehicle control apparatus 2 (a step S18). The target data outputting part 73 selects, as target data sets to be output, a predetermined number (e.g. 10 sets) of the derived target data sets from amongst the derived target data sets, and outputs only the selected target data sets to the vehicle control apparatus 2. The target data outputting part 73 preferentially selects target data sets closer to the host vehicle in the current lane, based on the longitudinal distances and the lateral distances of the target data sets.

Moreover, the target data outputting part 73 does not selects, as the target data set to be output to the vehicle control apparatus 2, a target data set of which the upper object flag is on. In other words, in a case where the target associated with the target data set is determined as the upper object, the target data outputting part 73 excludes the target data set from this process and does not output the target data set to the vehicle control apparatus 2. Thus, the vehicle control apparatus 2 is prevented from controlling the brake and the like of the host vehicle based on the target data set of the upper object.

The target data sets derived in the target data acquisition process described above are store in the memory 65 and are used as the previous target data sets in a next and subsequent target data acquisition processes.

1-4. Problem of Conventional Radar Apparatus

As described above, in the target data acquisition process, whether or not the target associated with the target data set is an upper object is determined and the target data set of the upper object is not output to the vehicle control apparatus 2. However, there are cases where a conventional radar apparatus does not correctly determine that a target associated with a target data set is an upper object, depending on an environment where the host vehicle is traveling. Such a problem of the conventional radar apparatus will be hereinafter described.

Figure 7:
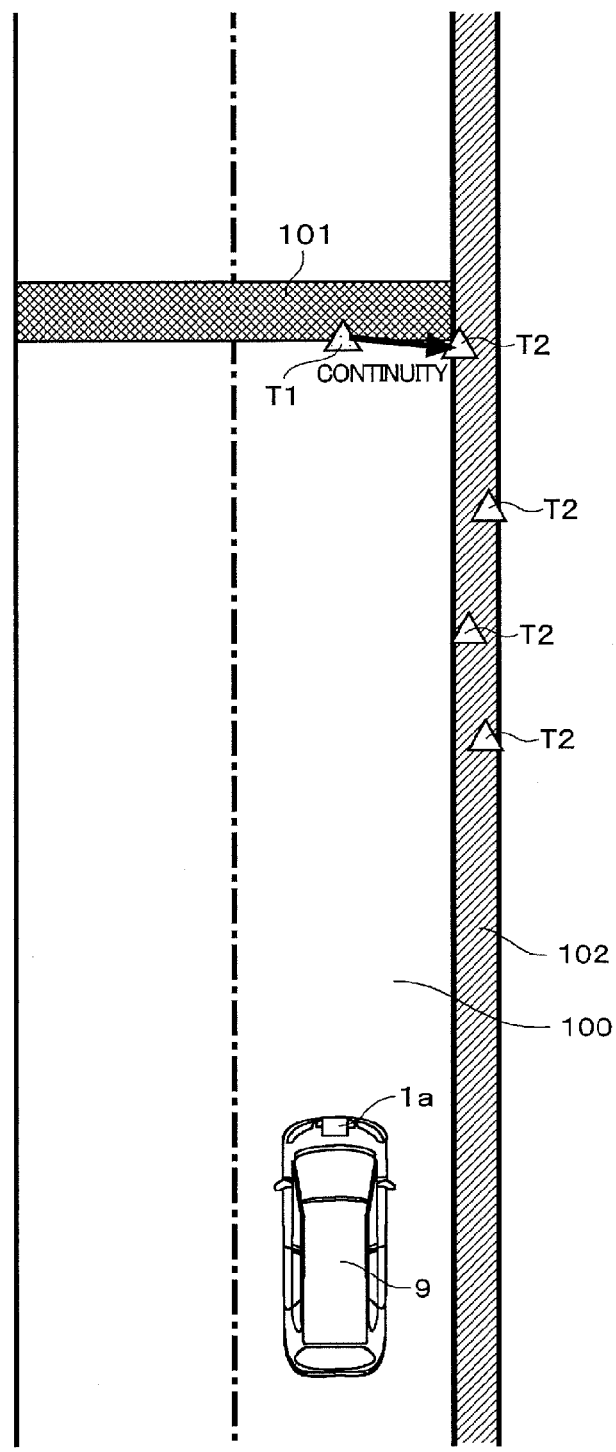
FIG. 7 illustrates an example of an environment in which the radar apparatus is used.

FIG. 7 illustrates an example of the environment in which a conventional radar apparatus 1a does not correctly determine that the target associated with the target data set is the upper object. As shown in FIG. 7, there is an upper object 101, such as a lighting device and an overpass, over a current lane 100 where a host vehicle 9 is traveling. Moreover, a side wall 102 extends along near the current lane 100 on a right side of the current lane 100. For example, such an environment sometimes occurs when the host vehicle 9 is traveling in a tunnel or on a highway.

As the host vehicle 9 moves closer to the upper object 101, the upper object 101 goes out of a range of a transmission wave output by the radar apparatus 1a. Therefore, the radar apparatus 1a becomes difficult to receive a reflection wave from the upper object 101. Thus, normally, as the host vehicle 9 moves closer to the upper object 101, it is less frequently determined that there is a temporal continuity between the target data set T1 of the upper object 101 and a latest target data set. Therefore, a frequency of the extrapolation for the upper object 101 increases. As a result, the target associated with the target data set T1 is determined as an upper object and the target data set T1 is not output to the vehicle control apparatus 2.

However, as shown in FIG. 7, in a case where there is the side wall 102, target data sets T2 of the side wall 102 are derived. Therefore, in some cases, the conventional radar apparatus wrongly determines that there is a temporal continuity between the target data set T1 of the upper object 101 and one of the target data sets T2 of the side wall 102. As a result, the target associated with the target data set T1 is not determined as an upper object and there is a possibility that the target data set T1 is output to the vehicle control apparatus 2.

Moreover, since the parameters of the target data sets are smoothed, in the direction in which the time advances, in the filtering process, lateral distances of the target data sets are gradually changed. Therefore, in the case where it is wrongly determined that there is a temporal continuity between the target data set of the target and one of the target data sets of the side wall, the lateral distance of the target data set is not immediately changed to a lateral distance of the side wall 102 and thus the lateral distance of the target data set of the target shows the target remaining in the current lane for a while. Therefore, there is a possibility that the vehicle control apparatus 2 controls the brake and the like of the host vehicle 9 based on the target data set.

1-5. Continuity Determination Process

In order to solve the problem, the wall detector 72a of the target data processor 72 of the radar apparatus 1 in this embodiment detects a side wall along the current lane in the continuity determination process (the step S15 in FIG. 6). Then, in a case where it is determined that there is a temporal continuity between a latest target data set of a target and a previous target data set of a stationary object in the current lane and where the target associated with the latest target data set is in a range of the side wall, the continuity determiner 72b performs the extrapolation preferentially. Thus, the radar apparatus 1 is prevented from determining that there is the temporal continuity between a target data set of an upper object and the target data set of the side wall.

Figure 8:
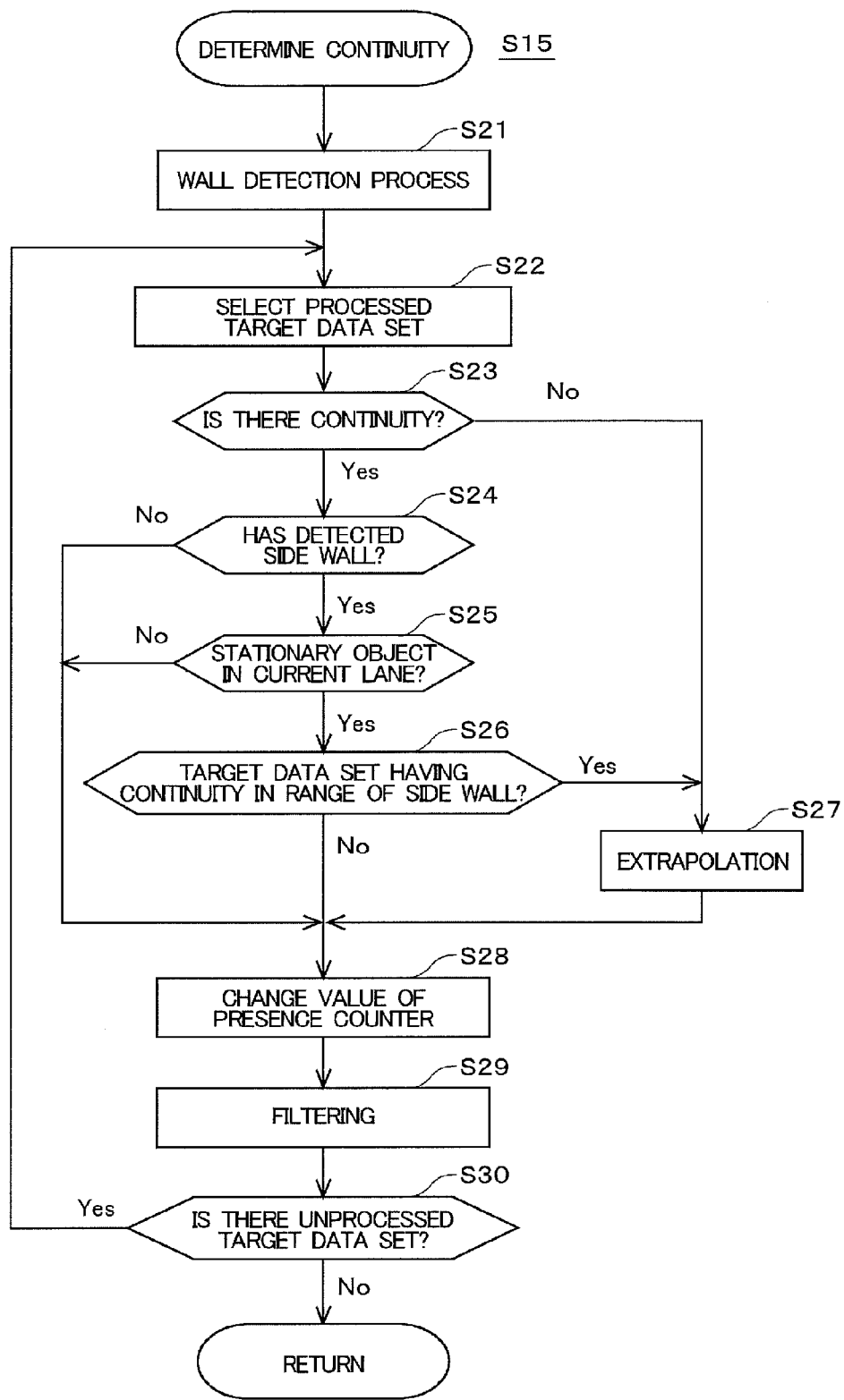
FIG. 8 illustrates a flow of a continuity determination process.

FIG. 8 illustrates a detailed flow of the continuity determination process. The continuity determination process will be hereinafter described in details. First, the wall detector 72a performs a wall detection process to detect, based on a target data set, a side wall along the current lane in which the host vehicle is traveling.

The wall detector 72a first detects a right side wall. More specifically, the wall detector 72a selects previous target data sets that satisfy all of conditions (a1) to (a4) listed below. Then, the wall detector 72a derives a smallest lateral distance among lateral distances of the selected previous target data sets, as a side wall representative value that shows a position of the side wall.

(a1) Moving object flag=off
(a2) Preceding vehicle flag=off
(a3) Longitudinal distance≤70 (m)
(a4) 1.3 (m)≤lateral distance≤3.6 (m)

Based on the conditions (a1) and (a2), it is determined whether or not the targets associated with the previous target data sets are stationary objects. Based on the condition (a3), less-accurate previous target data sets are excluded. Base on the condition (a4), it is determined whether or not targets associated with the previous target data sets exist near the host vehicle and on a right side thereof.

Figure 9:
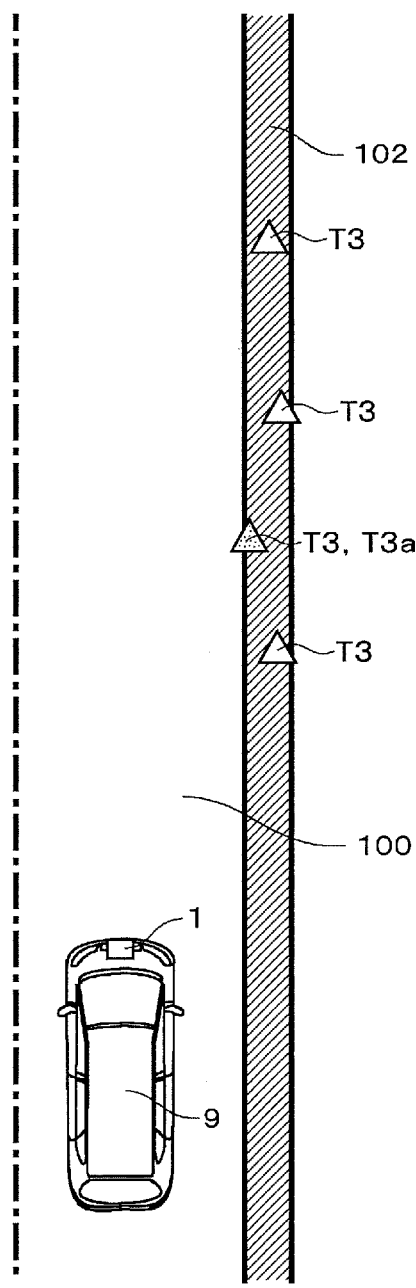
FIG. 9 illustrates a method of deriving a side wall representative value.

FIG. 9 illustrates a method of deriving the side wall representative value. In a case where the side wall 102 extends on the right side of the current lane 100, plural target data sets T3 of the side wall 102 extending near the host vehicle 9 and on the right side thereof are derived. The wall detector 72a sets, as the side wall representative value, a smallest lateral distance of a target data set T3a that is a target data set closest to the current lane 100, among the target data sets T3.

Moreover, in a case where there is no previous target data set that satisfies the conditions (a1) to (a4) above and where the side wall representative value cannot be derived, the wall detector 72a selects latest target data sets (pair data sets) that satisfy conditions (b1) to (b3) below. Then, the wall detector 72a derives, as the side wall representative value, a smallest lateral distance among lateral distances of the selected latest target data sets.

(b1) Absolute value of ground speed≤5.0 (km/h)
(b2) Longitudinal distance≤70 (m)
(b3) 1.3 (m)≤lateral distance≤3.6 (m)

Based on the condition (b1), it is determined whether or not targets associated with the latest target data sets are stationary objects. The ground speed in the condition (b1) is derived based on a relative speed of each of the latest target data sets and on a speed of the host vehicle. Purposes of the conditions (b2) and (b3) are the same as the purposes of the conditions (a3) and (a4).

Next, in a case where there are three or more previous target data sets that satisfy conditions (c1) to (c4) below, the wall detector 72a determines that the side wall extends on the right side of the current lane. In the case where there are three or more previous target data sets that satisfy the conditions (c1) to (c4) below, there are three or more target data sets of a stationary object that are close to the side wall representative value.

(c1) Moving object flag=off
(c2) Preceding vehicle flag=off
(c3) Longitudinal distance≤70 (m)
(c4) (Side wall representative value−0.5) (m)≤lateral distance≤(side wall representative value+0.5) (m)

Moreover, in a case where presence of the side wall cannot be determined based on the foregoing conditions (c1) to (c4) but where there are three or more latest target data sets (pair data sets) that satisfy conditions (d1) to (d3) below, the wall detector 72a determines that the side wall extends on the right side of the current lane.

(d1) Absolute value of ground speed≤5.0 (km/h)
(d2) Longitudinal distance≤70 (m)
(d3) (Side wall representative value−0.5) (m)≤lateral distance≤(side wall representative value+0.5) (m)

As described above, in a case where the wall detector 72a determines that the side wall extends on the right side of the current lane, the wall detector 72a uses the derived side wall representative value as "right side wall representative value." Thus, the wall detector 72a detects the side wall on the right side of the current lane. The wall detector 72a detects a side wall on a left side along the current lane in a similar manner described above. In a case where the wall detector 72a determines that the side wall extends on the left side of the current lane, the wall detector 72a uses a derived side wall representative value as "left side wall representative value."

Next, the continuity determiner 72b selects one of the previous target data sets, as a "processed target data set" that is a target data set to be processed (a step S22).

Next, the continuity determiner 72b determines whether or not there is a latest target data set (pair data set) that has a temporal continuity with the processed target data set (a step S23). In other words, the continuity determiner 72b determines whether or not there is the latest target data set that is associated with a same target with which the processed target data sets are associated.

The continuity determiner 72b first estimates current parameters (longitudinal distance, relative speed and lateral distance) of the processed target data set, based on the parameters of the processed target data set. Thus, the continuity determiner 72b derives a prediction data set that has the estimated parameters and that is not an actual target data set. Then, the continuity determiner 72b determines whether or not there is a latest target data set, among the latest target data sets, that has parameters close to the parameters of the derived prediction data set.

In a case where there is no latest target data set that has the parameters close to the parameters of the derived prediction data set (No in the step S23), the continuity determiner 72b determines that there is no continuity between the processed target data set and the latest target data sets, and then performs the "extrapolation." In other words, the continuity determiner 72b uses, as the latest target data set, the prediction data set derived based on the processed target data set (a step S27). After the continuity determiner 72b performs the "extrapolation," the process moves to a step S28.

On the other hand, in a case where there is a latest target data set that has the parameters close to the parameters of the derived prediction data set (Yes in the step S23), the continuity determiner 72b determines that there is a continuity between the processed target data set and the latest target data set. In other words, the continuity determiner 72b determines that the latest target data set represents a same target with which the processed target data set is associated.

Next, the continuity determiner 72b determines whether or not the wall detector 72a has detected a side wall on the right side or on the left side of the current lane in the wall detection process in the step S21. In a case where the wall detector 72a has detected no side wall on either the right or left side (No in a step S24), the process moves to the step S28.

On the other hand, in a case where the wall detector 72a has detected the side wall on one of the right side and the left side (Yes in the step S24), the continuity determiner 72b next determines whether or not a target associated with the processed target data set is a stationary object in the current lane that may be an upper object (a step S25). More specifically, the continuity determiner 72b determines whether or not the processed target data set satisfies conditions (e1) to (e5) below.

(e1) Moving object flag=off
(e2) Preceding vehicle flag=off
(e3) Longitudinal distance≤50 (m)
(e4) Absolute lateral distance≤1.5 (m)
(e5) Time to collision≤4.0 (s)

Based on the conditions (e1) and (e2), it is determined whether or not the target associated with the processed target data set is a stationary object. Based on the condition (e3), less-accurate processed target data sets are excluded. Base on the condition (e4), it is determined whether or not the target associated with the processed target data set is in the current lane. Moreover, based on the condition (e5), the processed target data sets having a low possibility of a collision with the host vehicle are excluded. The "time to collision (TTC) in the condition (e5) is a time period until the host vehicle will collide with the target associated with the processed target data set and is derived by dividing the longitudinal distance of the processed target data set by the relative speed.

In a case where the processed target data set does not satisfy any one of the conditions (e1) to (e5) (No in the step S25), the process moves to the step S28.

On the other hand, in a case where the processed target data set satisfies the conditions (e1) to (e5) (Yes in the step S25), the continuity determiner 72b next determines whether or not the target associated with the latest target data set determined as having a temporal continuity with the processed target data set (hereinafter referred to as "processed latest target data set") is included in the range of the side wall (a step S26). More specifically, the continuity determiner 72b determines whether or not the processed latest target data set satisfies conditions (f1) to (f2) below.

(f1) Lateral distance difference between prediction data set and processed latest target data set≥0.5 (m)
(f2) (Right side wall representative value−0.5) (m)≤lateral distance≤(right side wall representative value+1.5) (m) or (left side wall representative value−1.5) (m)≤lateral distance≤(left side wall representative value+0.5) (m)

Based on the condition (f1), it is confirmed whether or not it has been determined that a lateral distance between those target data sets are relatively away from each other and that there is a temporal continuity between those target data sets. Moreover, based on the condition (f2), it is determined whether or not the target associated with the processed latest target data set is included in one of the ranges of the side walls on the right side and the left side of the current lane.

In a case where the processed latest target data set does not satisfy any one of the conditions (f1) and (f2), the process moves to the step S28.

In a case where the processed latest target data set satisfies the conditions (f1) and (f2) above, the target associated with the processed latest target data set is included in one of the ranges of the side walls on one of the right side and the left side of the current lane. In other words, in a case where it is determined that there is the temporal continuity between the latest target data set of the target and the previous target data set of the stationary object in the current lane and where the target associated with the latest target data is included in one of the ranges of the side walls. In this case, there is a high probability that presence of a temporal continuity is wrongly determined between the target data set of the upper object and the target data set of the side wall on the right side or the left side. Therefore, in this case (Yes in the step S26), the continuity determiner 72b performs the extrapolation preferentially. In other words, the continuity determiner 72b uses the prediction data set derived based on the processed target data set, instead of the processed latest target data set (the step S27). Once performing the extrapolation, the process moves to the step S28.

Next, in the step S28, the continuity determiner 72b changes a value of the "presence counter" of the processed target data set (the step S28). The presence counter represents a probability of presence of the target associated with the target data set. The higher the probability of the presence of the target, the greater the value of the presence counter is. The initial value of the presence counter is set at, for example, "8."

The continuity determiner 72b changes the value of the presence counter of the processed target data set, depending on determination result of the temporal continuity. For the processed target data set that has been determined as having the continuity, the continuity determiner 72b changes the value of the presence counter by "+4" in a range up to a predetermined maximum value (e.g. "35"). On the other hand, the continuity determiner 72b changes the value of the presence counter by "−2" for the processed target data set for which the extrapolation has been performed.

Then, the continuity determiner 72b eliminates from the memory 65 the processed target data set of which a value of the presence counter is equal to or less than a minimum value (e.g. "0") by changing the value of the presence counter. As for the processed target data set of which the value of the presence counter is "0" or below, the extrapolation is often performed. Therefore, there is a high possibility that the target associated with the processed target data set does not already exist ahead of the host vehicle. Therefore, the continuity determiner 72b eliminates such a processed target data set from the memory 65 and excludes such a processed target data set from the process.

Next, the continuity determiner 72b performs the filtering process to smooth the parameters (longitudinal distance, relative speed and lateral distance) of the processed target data set in a direction in which the time advances (a step S29). More specifically, the continuity determiner 72b derives, as new parameters of the processed target data set, an average of weighted parameters of the prediction data set derived based on the processed target data set and weighted parameters of the processed latest target data set. A weight given to the parameters of the prediction data set is, for example, "0.75" and a weight given to the parameters, which are instantaneous values, of the processed latest target data set is, for example, "0.25." There is a possibility that a parameter that is an instantaneous value is an abnormal value due to, noise, etc. However, use of the abnormal value can be prevented by the filtering process. The parameters of the processed target data set are updated by the filtering process and the processed target data set is changed into the filter data set.

As described above, once the process of one previous target data set is completed, the continuity determiner 72b determines whether or not there is an unprocessed previous target data set that is not selected as a processed target data set (a step S30). In a case where there is the unprocessed previous target data set (Yes in the step S30), the continuity determiner 72b selects the unprocessed previous target data set as a new processed target data set (the step S22) and performs the process described above. Such a process is repeated for all of the previous target data sets to determine whether or not the previous target data sets have the temporal continuity with the latest target data set.

1-6. Upper Object Determination Process

As described above, in the continuity determination process, in a case where it is determined that there is the temporal continuity between the latest target data set and the previous target data set of the stationary object in the current lane and where the target associated with the latest target data is in one of the ranges of the side walls, the extrapolation is performed preferentially. Thus, a frequency of the extrapolation performed for the target data set of an upper object can be increased. The upper object determiner 72c determines in the upper object determination process (the step S17 in FIG. 6) whether or not the target associated with the target data set is an upper object based on the frequency of the "extrapolation."

Figure 10:
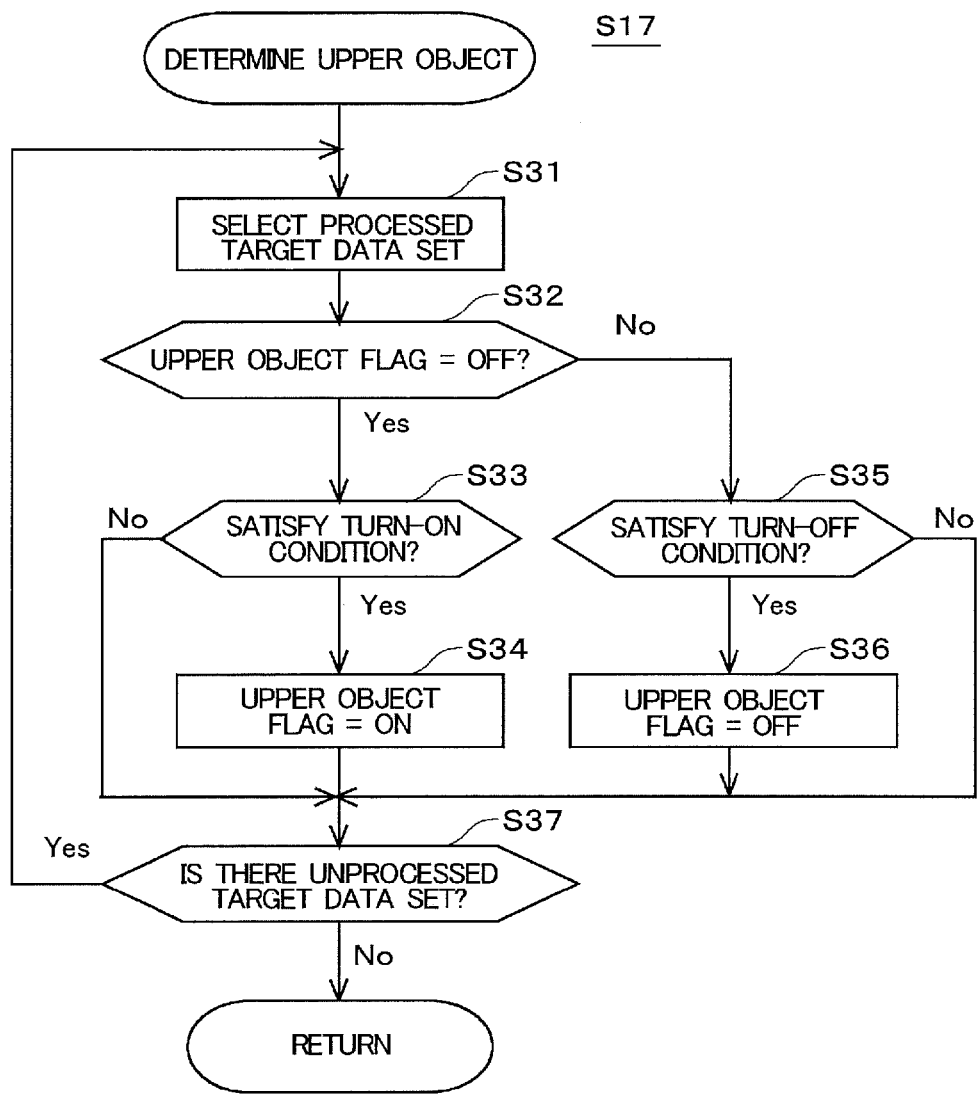
FIG. 10 illustrates a flow of an upper object determination process in the first embodiment.

FIG. 10 illustrates a detailed flow of the upper object determination process. The detailed flow of the upper object determination process will be hereinafter described.

First, the upper object determiner 72c selects one of the target data sets as a "processed target data set" that is a target data set to be process (a step S31).

Next, the upper object determiner 72c determines whether or not the upper object flag of the processed target data set is off (a step S32). An initial value of the upper object flag is off.

In a case where the upper object flag of the processed target data set is off (Yes in the step S32), the upper object determiner 72c determines whether or not the processed target data set satisfies turn-on conditions to turn on the upper object flag (a step S33). More specifically, the upper object determiner 72c determines whether or not the processed target data set satisfies conditions (g1) and (g2) below.

(g1) Power variable value<threshold (g2) Five or more "extrapolation" is performed in seven previous target data acquisition processes The power variable value in the condition (g1) is derived based on signal powers of the period data sets from which the processed target data set is derived. Moreover, based on the condition (g2), it is determined whether or not the frequency of the "extrapolation" (frequency of use of the prediction data set) is relatively high.

In a case where the processed target data set satisfies the conditions (g1) and (g2) (Yes in the step S33), the upper object determiner 72c turns on the upper object flag of the processed target data set (a step S34). In other words, the upper object determiner 72c determines that a target associated with the processed target data set is an upper object. Since in a case of an upper object, a frequency of the "extrapolation" performed for the target data set increases, the upper object determiner 72c accurately determines that the target associated with the target data set is an upper object.

On the other hand, in a case where the upper object flag of the processed target data set is on (No in the step S32), the upper object determiner 72c determines whether or not the processed target data set satisfies a turn-off condition to turn off the upper object flag (a step S35). More specifically, the upper object determiner 72c determines whether or not the processed target data set satisfies a condition (h1) below.

(h1) Power variable≥value threshold

In a case where the processed target data set satisfies the turn-off condition (h1) (Yes in the step S35), the upper object determiner 72c turns off the upper object flag of the processed target data set (a step S36). Thus, even if the upper object determiner 72c has wrongly determined that the target associated with the processed target data set is an upper object, the wrong determination can be changed.

As described above, once the process of one of the target data sets is completed, the upper object determiner 72c determines whether or not there is an unprocessed target data set that is not selected as a processed target data set (a step S37). In a case where there is the unprocessed target data set (Yes in the step S37), the upper object determiner 72c selects the unprocessed target data set as a new processed target data set (the step S31) and performs the process described above. Such a process is repeated for all of the target data sets to determine whether or not targets associated with the target data sets are upper objects.

1-7. Conclusion

As described above, the target data derivation part 71 of the radar apparatus 1 in this embodiment derives, in the predetermined time cycle, the target data set of the target based on the reception signal acquired based on the reflection wave RW reflected by the target. The wall detector 72a detects, based on the target data set, a side wall along the current lane in which the host vehicle is traveling. The continuity determiner 72b determines whether or not there is the temporal continuity between the previous target data set and the latest target data set. In a case where there is no temporal continuity, the continuity determiner 72b performs the "extrapolation." The upper object determiner 72c determines whether or not the target associated with the target data set is an upper object, based on a frequency of the "extrapolation." Then, in a case where it is determined that there is the temporal continuity between the latest target data set of the target and the previous target data set of the stationary object in the current lane and where the target associated with the latest target data is in the range of the side wall, the continuity determiner 72b performs the "extrapolation."

Therefore, even in a case where the side wall extends along the current lane, a frequency of the extrapolation performed for the target data set of an upper object can be increased and the target associated with the target data set is accurately determined as the upper object. Therefore, the target data set of the upper object is not output to the vehicle control apparatus 2, and thus the vehicle control apparatus 2 is prevented from controlling the brake and the like of the host vehicle based on the target data set of the upper object.

Figure 11:
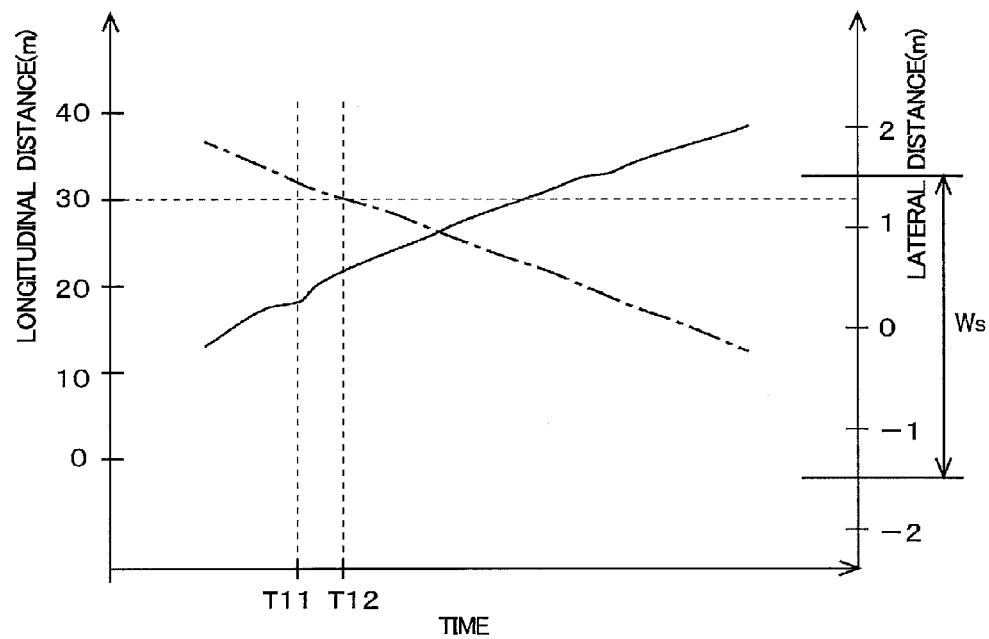
FIG. 11 illustrates an example of a target data set that a radar apparatus outputs.
Figure 12:
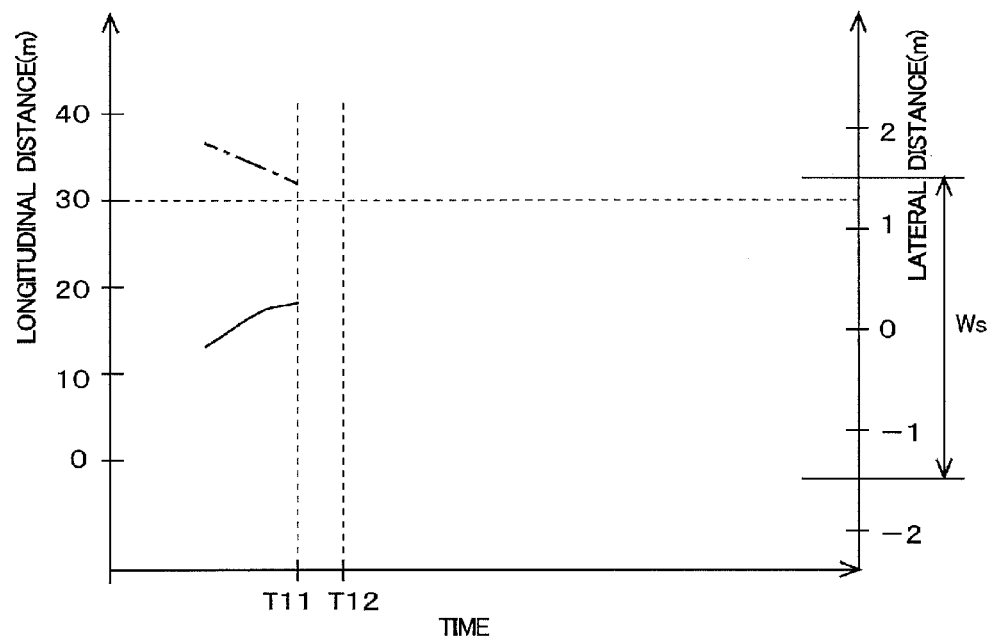
FIG. 12 illustrates an example of a target data set that a radar apparatus outputs.

FIG. 11 and FIG. 12 illustrate examples of target data sets that the radar apparatus outputs to the vehicle control apparatus 2 in a case where a right side wall extends along the current lane and where there is an upper object exists. FIG. 11 shows a target data set output by the conventional radar apparatus 1a (refer to FIG. 7). FIG. 12 shows a target data set output by the radar apparatus 1 in the embodiment. Horizontal axes, left vertical axes and right vertical axes of FIGS. 11 and 12 show time, longitudinal distance and lateral distance, respectively. Dashed-dotted lines show the longitudinal distance and the solid lines show the lateral distance of the target data sets in those drawings.

For example, in a case where the lateral distance of the target data set is in a range Ws of the current lane (hereinafter referred to as "lane range") from −1.5 (m) to +1.5 (m), the vehicle control apparatus 2 recognizes that the target associated with the target data set is in the current lane. Then, in a case where the longitudinal distance of the target data set is 30 (m) or less and where the lateral distance of the target data set is in the lane range Ws, the vehicle control apparatus 2 controls the brake and the like of the host vehicle to reduce an impact of a collision with the target associated with the target data set.

As shown in FIG. 11, the conventional radar apparatus 1a does not correctly determine the target associated with the target data set as an upper object and continuously outputs the target data set about the upper object to the vehicle control apparatus 2. As the longitudinal distance of the target data set decreases, the lateral distance of the target data set becomes greater (the data set shows a shift of the target to a right side of the host vehicle). However, at a time point T12 when the longitudinal distance of the target data set becomes 30 (m) or less, the lateral distance of the target data set is in the lane range Ws. Therefore, there is a possibility that the vehicle control apparatus 2 controls the brake and the like of the host vehicle based on the target data set.

On the other hand, as shown in FIG. 12, the radar apparatus 1 in this embodiment correctly determines that the target associated with the target data set is an upper object at a time point T11, earlier than the time point T12. Therefore, the radar apparatus 1 does not output the target data set to the vehicle control apparatus 2 from the time point T11. As a result, the vehicle control apparatus 2 is prevented from controlling the brake and the like of the host vehicle based on the target data set.

2. Second Embodiment

Next, a second embodiment will described. A configuration and operations of a vehicle control system 10 in the second embodiment are substantially the same as the configuration and the operations in the first embodiment. Therefore, differences from the first embodiment are hereinafter mainly described.

In the second embodiment, in a case where a target data set of a target that has newly appeared satisfies predetermined conditions, the vehicle control system 10 determines that the new target associated with the target data set is an upper object. Thus, the target associated with the target data set is more accurately determined as the upper object.

Figure 13:
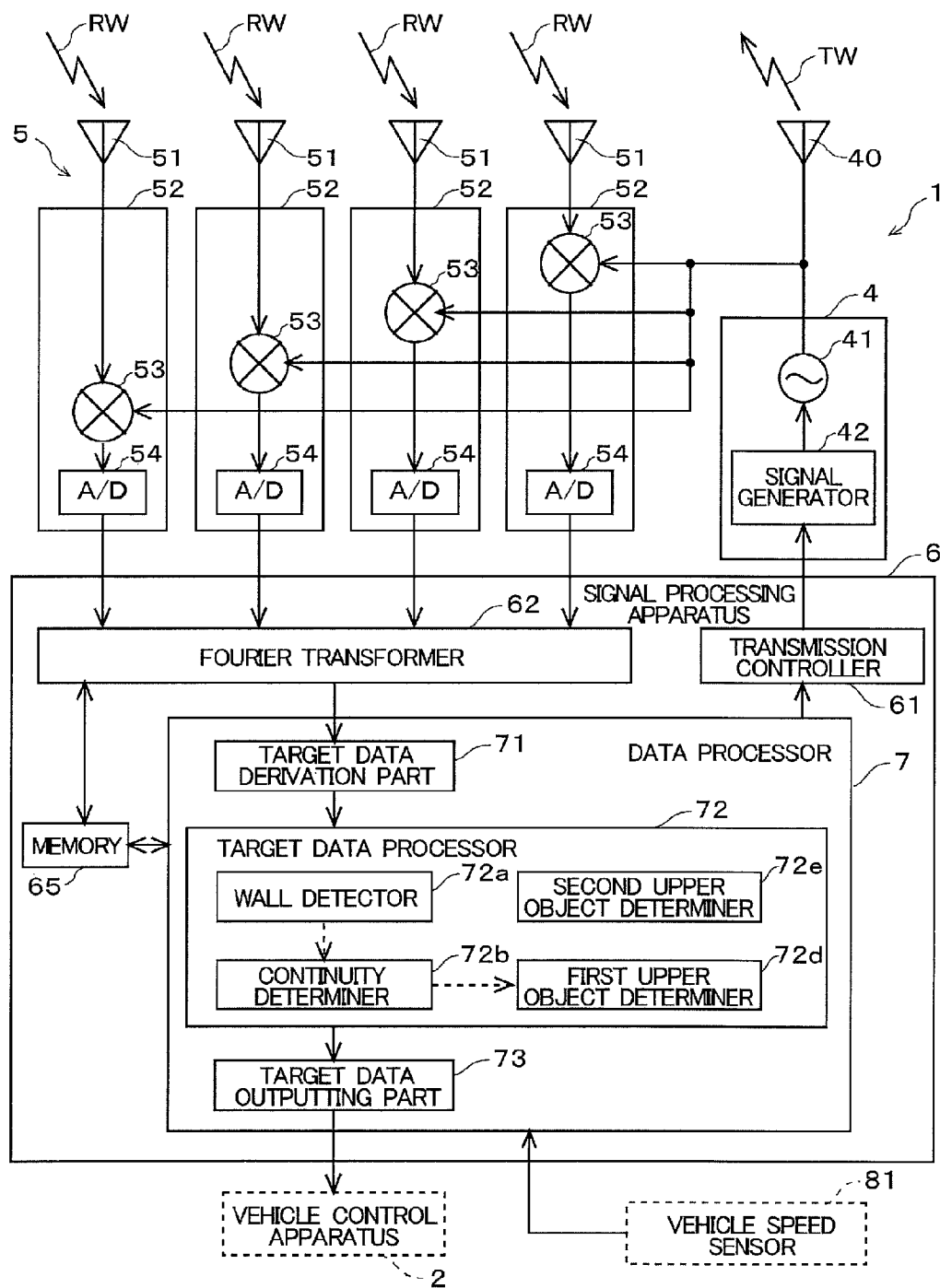
FIG. 13 illustrates a configuration of a radar apparatus in a second embodiment.

FIG. 13 illustrates the configuration of a radar apparatus 1 in the second embodiment. The radar apparatus 1 in the second embodiment includes a first upper object determiner 72d and a second upper object determiner 72e, instead of the upper object determiner 72c in the first embodiment shown in FIG. 2, as sub-functions of a target data processor 72. Other portion of the configuration of the radar apparatus 1 in the second embodiment is substantially the same as the configuration of the radar apparatus 1 in the first embodiment.

The first upper object determiner 72d performs the same process as the upper object determiner 72c does in the first embodiment. In other words, the first upper object determiner 72d determines whether or not a target associated with a target data set is an upper object, based on a frequency of "extrapolation." On the other hand, in a case where the target data set of the target that has newly appeared (hereinafter referred to as "new target data set) satisfies the predetermined conditions, the second upper object determiner 72e determines that the target associated with the new target data set is an upper object.

Figure 14:
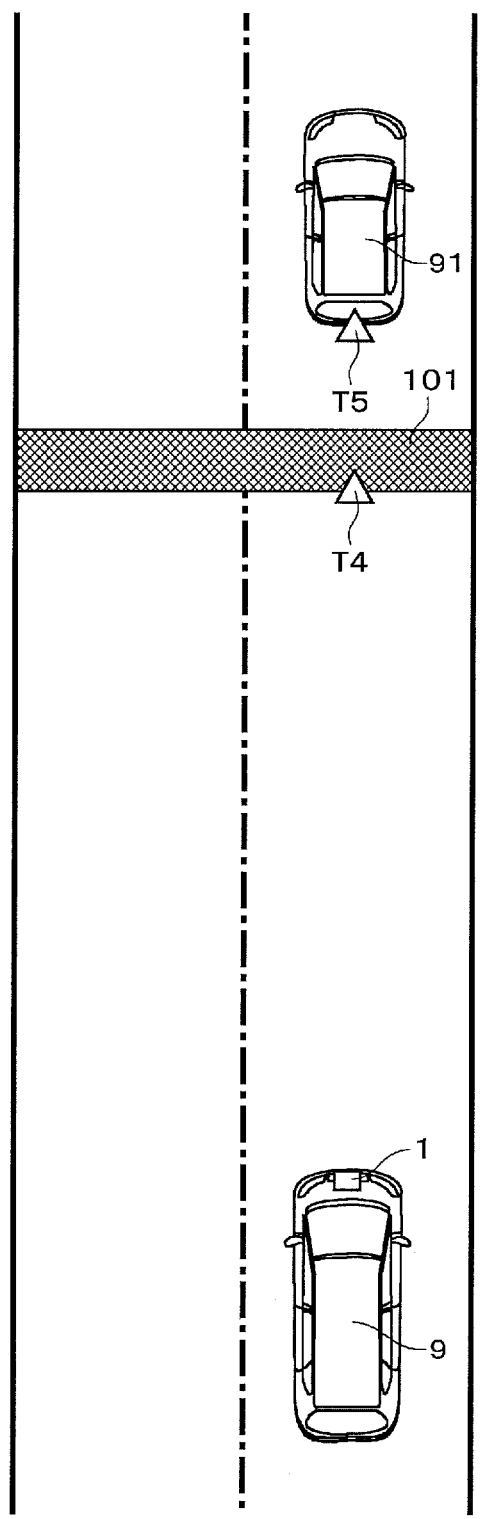
FIG. 14 illustrates a theory that is used for determination in the second embodiment.

FIG. 14 illustrates a theory that is used by the second upper object determiner 72e to determine whether or not the target associated with the new target data set is an upper object. FIG. 14 illustrates a case where the radar apparatus 1 derives a new target data set T4 of a stationary object that has newly appeared. In this case, a preceding vehicle 91, a car other than a host vehicle 9, travels ahead of the host vehicle 9 in a front area near the target associated with the new target data set T4, and the radar apparatus 1 derives a target data set T5 of the preceding vehicle 91.

For example, if the target associated with the new target data set T4 is a stationary target on a road surface of a current lane, the target has collided with the preceding vehicle 91. However, the target has not collided with the preceding vehicle 91. Thus the target associated with the new target data set T4 is determined as an upper object 101. The second upper object determiner 72e determines, based on this theory, that the target associated with the new target data set T4 is the upper object.

Figure 15:
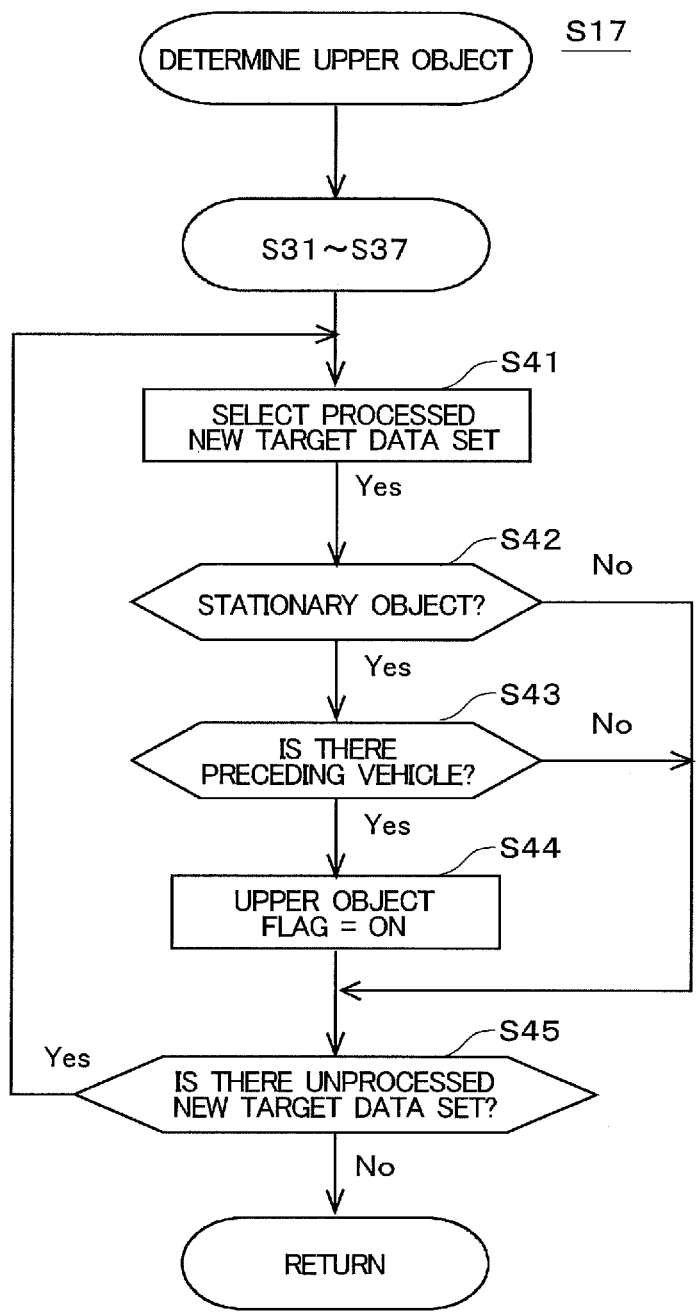
FIG. 15 illustrates a flow of an upper object determination process in the second embodiment.

FIG. 15 illustrates a detailed flow of an upper object determination process (the S17 in FIG. 6) in the second embodiment. The detailed flow of the upper object determination process in the second embodiment will be hereinafter described.

First, the first upper object determiner 72d performs the same process as the upper object determination process (the steps S31 to S37) in the first embodiment shown in FIG. 10. Thus, the first upper object determiner 72d determines, based on a frequency of the "extrapolation," whether or not targets associated with target data sets, excluding the target associated with the new target data set, are upper objects.

Next, the second upper object determiner 72e determines whether or not the target associated with the new target data set is an upper object. The second upper object determiner 72e deems a target data set of which a new object flag is on, as a new target data set.

The second upper object determiner 72e first selects one of the new target data sets as "processed new target data set" that is a target data set to be processed (a step S41).

Next, the second upper object determiner 72e determines whether or not a target associated with the processed new target data set is a stationary object (a step S42). More specifically, the second upper object determiner 72e determines whether or not the processed new target data set satisfies conditions (i1) and (i2) below.

(i1) Moving object flag=off
(i2) Preceding vehicle flag=off

In a case whether the processed new target data set satisfies the conditions (i1) and (i2) (Yes in the step S42), the second upper object determiner 72e then determines whether or not the preceding vehicle is within a predetermined distance in front of the target associated with the processed new target data set. More specifically, the second upper object determiner 72e determines whether or not there is a "search target data set" that is a target data set that satisfies conditions (j1) to (j3) below.

(j1) Preceding vehicle flag=on
(j2) −10 (m)≤(longitudinal distance of the processed new target data set−longitudinal distance of search target data set)≤0
(j3) Lateral distance difference between processed new target data set and search target data set 1.0 (m)

Based on the condition (j1), it is determined whether or not the target associated with the search target data set is an upper object. Based on the condition (j2), it is determined whether or not the target associated with the search target data set is within the predetermined distance (within 10 m from the target) in front of the target associated with the processed new target data set. Moreover, based on the condition (j3), it is determined whether or not a lateral distance of the processed new target data set is relatively close to a lateral distance of the search target data set (in that case, if a height difference between the two data sets is relatively small, there is a possibility that those targets will collide with each other).

In a case where there is the search target data set (target data set of the preceding vehicle) that satisfies the conditions (j1) to (j3) (Yes in the step S43), the second upper object determiner 72e turns on the upper object flag of the processed new target data set (a step S44). In other words, the second upper object determiner 72e determines that the target associated with the processed new target data set is the upper object.

As described above, once the process of one of the new target data sets is completed, the second upper object determiner 72e determines whether or not there is an unprocessed new target data set that is not selected as a processed target data set (a step S45). In a case where there is the unprocessed new target data set (Yes in the step S45), the second upper object determiner 72e selects the unprocessed new target data set as a new processed new target data set (the step S41) and performs the process described above. Such a process is repeated for all of the unprocessed new target data sets to determine whether or not targets associated with the new target data sets are upper objects.

As described above, in the case where the target associated with the target data set is a stationary object that has newly appeared and where there is a preceding vehicle within the predetermined distance in front of the target, the second upper object determiner 72e of the radar apparatus 1 in the second embodiment determines that the target is an upper object. Thus, the target associated with the target data set is more accurately determined as an upper object.

3. Third Embodiment

Next, a third embodiment will be described. A configuration and operations of a vehicle control system 10 in the third embodiment are substantially the same as the configuration and the operations in the first embodiment. Therefore, differences from the first embodiment will be hereinafter mainly described.

In the third embodiment, in a case where a target data set satisfies predetermined conditions, the vehicle control system 10 changes a condition that is used for an upper object determination process to increase a possibility that the target associated with a target data set is determined as an upper object. Thus, the target associated with the target data set is more accurately determined as the upper object.

Figure 16:
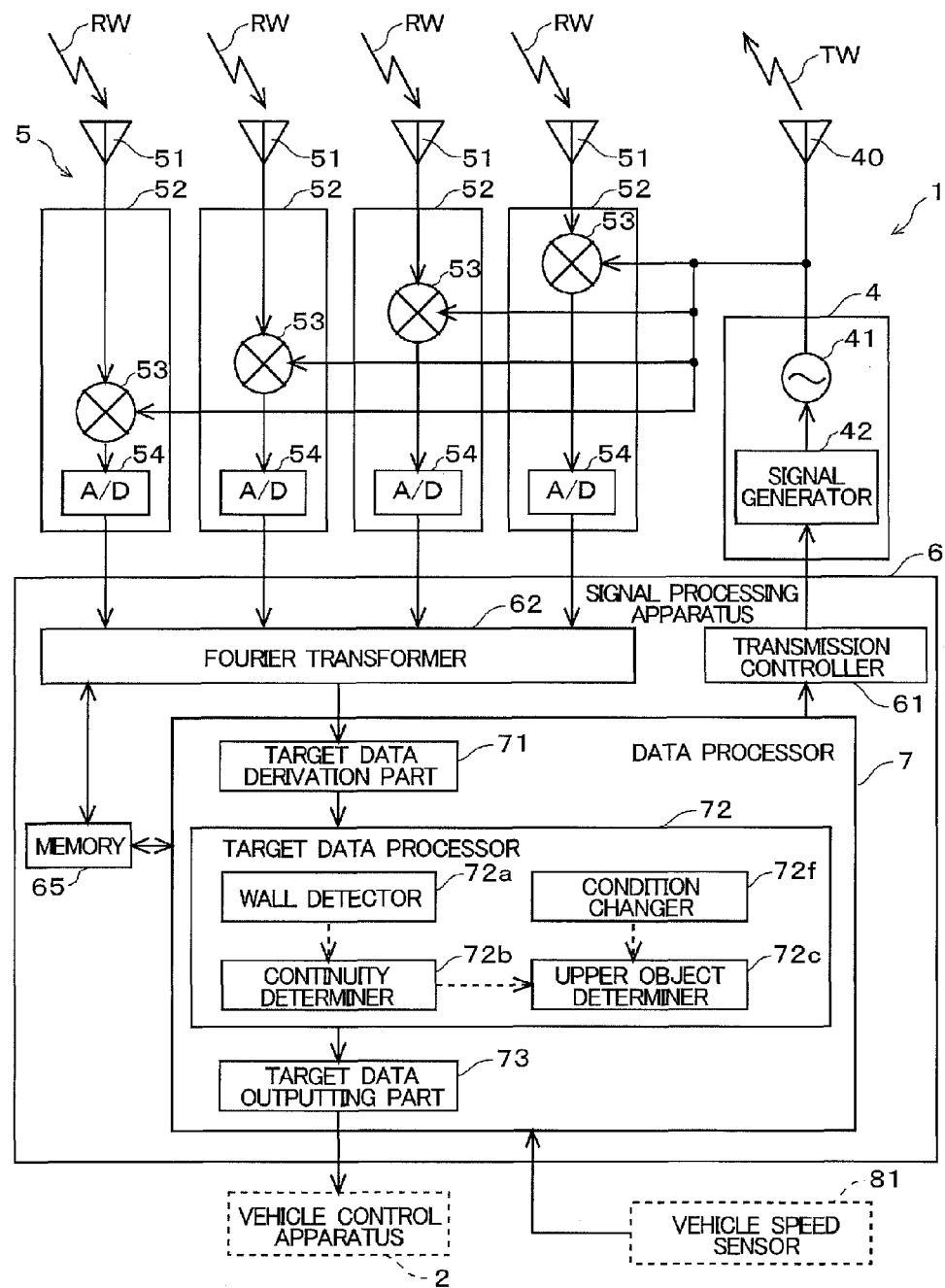
FIG. 16 illustrates a configuration of a radar apparatus in a third embodiment.

FIG. 16 illustrates the configuration of a radar apparatus 1 in the third embodiment. The radar apparatus 1 in the third embodiment includes a condition changer 72f as a sub-function of a target data processor 72, in addition to the configuration in the first embodiment shown in FIG. 2. Other portion of the configuration of the radar apparatus 1 in the third embodiment is substantially the same as the configuration of the radar apparatus 1 in the first embodiment.

In a case where a target data set of a stationary object satisfies the predetermined conditions, the condition changer 72f determines that there is a high probability that the target associated with the target data set is an upper object and relaxes a condition relating to a frequency of the "extrapolation" that is used in the upper object determination process. Thus, a possibility that the target associated with the target data set is determined as the upper object increases.

Figure 17:
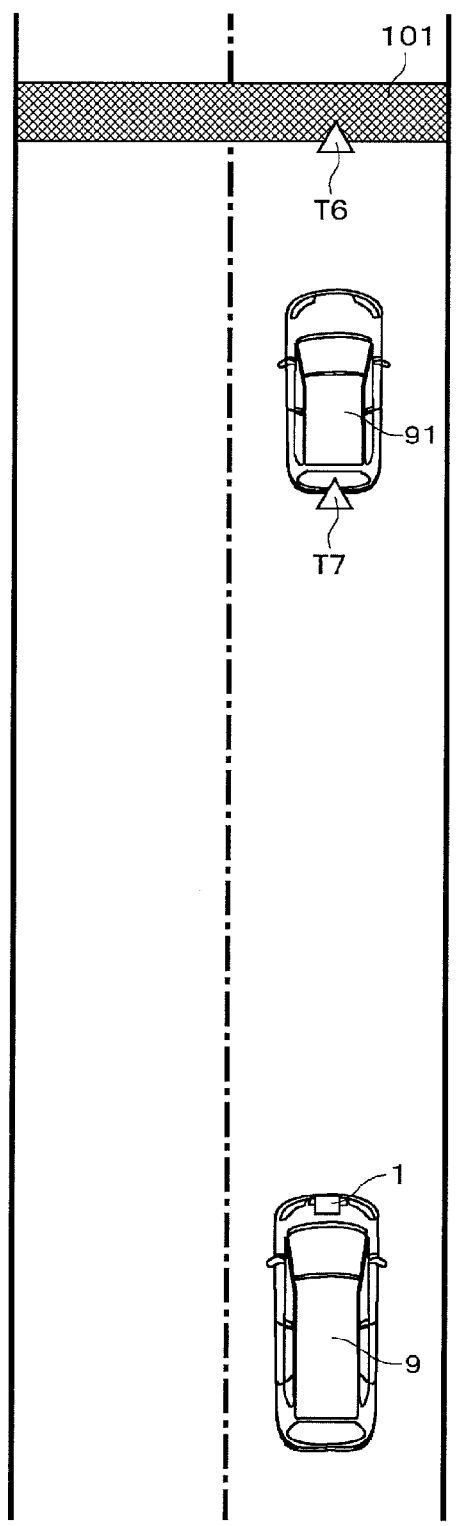
FIG. 17 illustrates a theory that is used for determination in the third embodiment.

FIG. 17 illustrates a theory that is used by the condition changer 72f to determine whether or not there is the high probability that the target associated with the target data set is the upper object. For example, there is a case where: the radar apparatus 1 derives a target data set T6 associated with a stationary object; a time to collision (TTC) of a host vehicle 9 with a target associated with the target data set T6 is a relatively small; there is a preceding vehicle 91, another vehicle traveling behind the target associated with the target data set T6 and, ahead of the host vehicle 9; and the radar apparatus 1 derives a target data set T7 associated with the preceding vehicle 91. In other words, there is a case where the preceding vehicle 91 between the target associated with the target data set T6 and the host vehicle 9.

A TTC of the preceding vehicle 91 with the target associated with the target data set T6 is smaller than the TTC of the host vehicle 9 with the target associated with the target data set T6. If the target associated with the target data set T6 is a stationary object on a road surface of a current lane, the preceding vehicle 91 should be in a dangerous situation where a possibility of a collision with the target is very high. In a case where the preceding vehicle 91 travels normally, the preceding vehicle 91 is not in the dangerous situation. Therefore, it is possible to determine that there is a high probability that the target associated with the target data set T6 is an upper object 101. Based on the theory, the condition changer 72f determines that there is the high probability that the target associated with the target data set T6 is the upper object.

Figure 18:
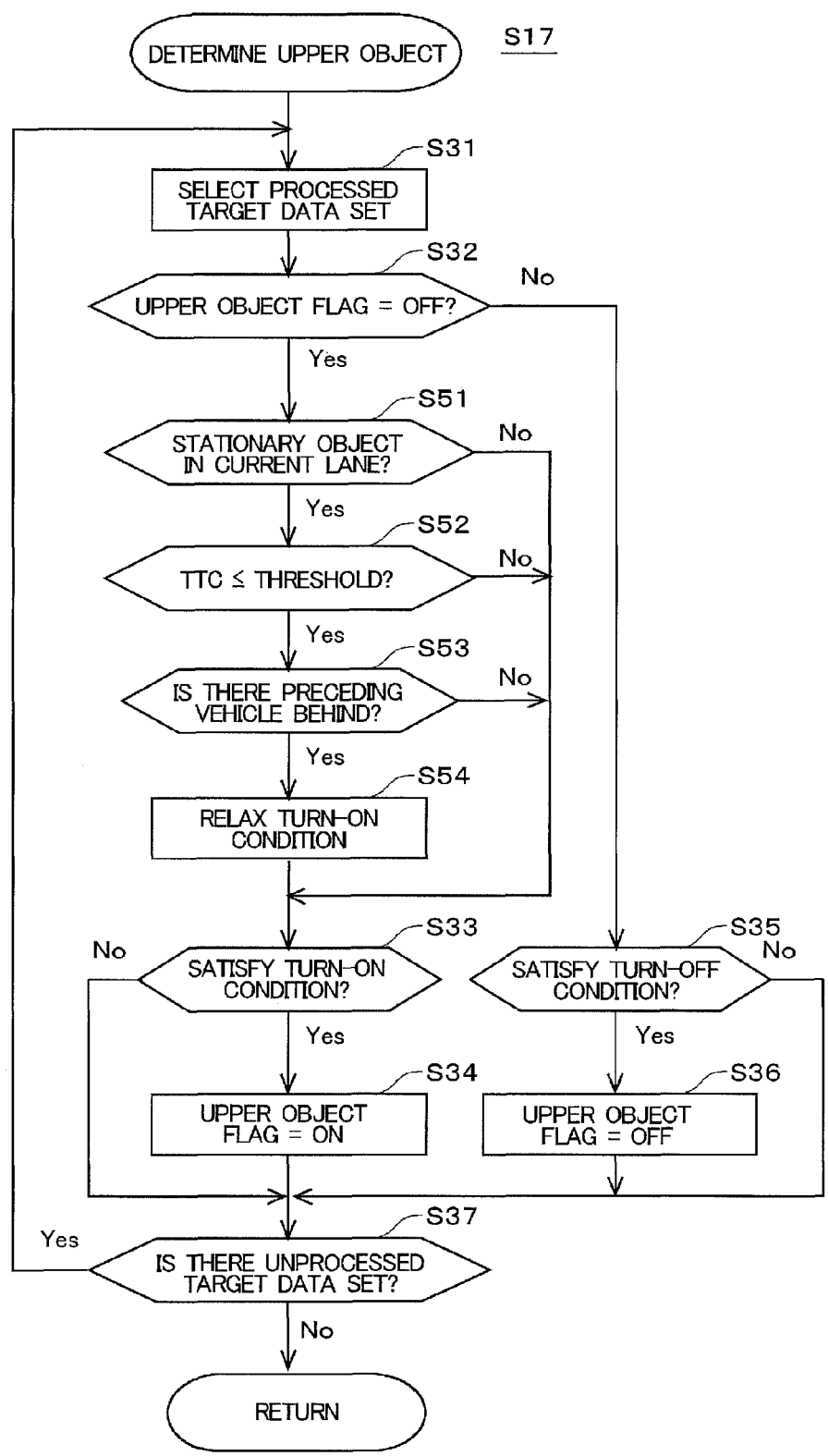
FIG. 18 illustrates a flow of an upper object determination process in the third embodiment.

FIG. 18 illustrates a detailed flow of the upper object determination process in the third embodiment. The condition changer 72f performs additional steps S51 to S54 between the step S32 and the step S33 of the upper object determination process in FIG. 10 in the first embodiment. The detailed flow of the upper object determination process in the third embodiment will be hereinafter described.

First, the upper object determiner 72c selects one of the target data sets as a "processed target data set" that is a target data set to be process (the step S31). Next, the upper object determiner 72c determines whether or not an upper object flag of the processed target data set is off (the step S32).

In a case where the upper object flag of the processed target data set is off (Yes in the step S32), the condition changer 72f determines whether or not a target associated with the processed target data set is a stationary object in the current lane (the step S51). More specifically, the condition changer 72f determines whether or not the processed target data set satisfies conditions (k1) to (k3) below.

(k1) Moving object flag=off
(k2) Preceding vehicle flag=off
(k3) Absolute value of lateral distance≤1.5 (m)

Based on the conditions (k1) and (k2), it is determined whether or not the target associated with the processed target data set is a stationary object. Based on the condition (k3), it is determined whether or not the target associated with the processed target data set is in the current lane.

In a case where the processed target data set satisfies the conditions (k1) to (k3) (Yes in the step S51), the condition changer 72f then determines whether or not a TTC of the host vehicle with the target associated with the processed target data set is equal to or less than a threshold (the step S52). More specifically, the condition changer 72f determines whether or not the processed target data set, satisfies a condition (l1) below.

(l1) TTC≤2.5 (s)

Based on the condition (l1), it is determined whether or not there is a high possibility of a collision of the host vehicle with the target associated with the processed target data set.

In a case where the processed target data set satisfies the condition (l1) (Yes in the step S52), the condition changer 72f determines next whether or not there is a preceding vehicle between the target associated with the processed target data set and the host vehicle (the step S53). More concretely, the condition changer 72f determines whether or not there is a "search target data set" that is a target data set that satisfies conditions (m1) to (m4) below.

(m1) Preceding vehicle flag=on
(m2) Absolute value of lateral distance≤1.5 (m)
(m3) Longitudinal distance of processed target data set-≥longitudinal distance of search target data set
(m4) Lateral distance difference between processed target data set and search target data set≤1.0 (m)

Based on the condition (m1), it is determined whether or not the target associated with the search target data set is a preceding vehicle. Based on the condition (m2), it is determined whether or not the target associated with the search target data set is in the current lane. Based on the condition (m3), it is determined whether or not the target associated with the search target data set is behind the target associated with the processed target data set. Based on the condition (m4), it is determined whether or not a lateral distance of the processed target data set is relatively close to a lateral distance of the search target data set (in that case, if a height difference between the two data sets is relatively small, there is a possibility that those targets will collide with each other).

In a case where there is the search target data set that satisfies the conditions (m1) to (m4) (target data set of the preceding vehicle) (Yes in the step S53), the condition changer 72f relaxes a turn-on condition that is used by an upper object determiner 72c to turn on the upper object flag (the step S54). The conditions (g1) and (g2) described above are normally used as the turn-on conditions. However, the condition changer 72f changes the turn-on condition (g2) to a turn-on condition (g3) below.

(g3) Three times or more of "extrapolation" in last seven target data acquisition processes In other words, the condition changer 72f relaxes the condition relating to a frequency of the "extrapolation" (frequency of use of a prediction data set) (from five times to three times out of seven times). Thus, the next step S33 increases a possibility that the target associated with the processed target data set is determined as the upper object.

As described above, in the case where: the target associated with the target data set is the stationary object; the TTC of the host vehicle with the target is equal to or less than the threshold; and there is another vehicle between the target and the host vehicle, the condition changer 72f changes the turn-on condition that is used by the upper object determiner 72c. Thus, the possibility that the target associated with the target data set is determined as the upper object increases. Therefore, the target associated with the target data set is more accurately determined as the upper object.

4. Modifications

The embodiments of the invention are described above. However, the invention is not limited to the foregoing embodiments and other various modifications are possible. Examples of the various modifications will be hereinafter explained. Any of all forms including the foregoing embodiments and the modifications explained below may be appropriately combined with another or others.

In the foregoing embodiments, the upper object flag is turned on for the target data set of the target determined as an upper object, and thus the target data set of which the upper object flag is on is not output to the vehicle control apparatus 2. On the other hand, a target data set of a target determined as an upper object may be eliminated from a memory 65 not to output the target data set to a vehicle control apparatus 2.

Moreover, in the foregoing embodiments, the vehicle control apparatus 2 controls the host vehicle to reduce impact of a collision with an object. However, the vehicle control apparatus 2 may be an apparatus that controls a host vehicle for another purpose, such as following another vehicle.

In the foregoing embodiments, all or a part of the various functions that are described to be implemented by software may be implemented by an electrical hardware circuit. Moreover, a function that is described as a block in the foregoing embodiments may be implemented by cooperation between software and hardware.

While the invention has been shown and described in detail, the foregoing description is in all aspects illustrative and not restrictive. It is therefore understood that numerous other modifications and variations can be devised without departing from the scope of the invention.

What is claimed is:

1. A radar apparatus that acquires a target data set of a target near a host vehicle, the radar apparatus comprising:
a signal processor configured to:
derive the target data set of the target, in a predetermined time cycle, based on a reception signal acquired by receiving a reflection wave from an environment including the target;
detect presence of a wall along a current lane in which the host vehicle is traveling;
determine whether or not there is a temporal continuity between a previous target data set and a latest target data set, in a case where there is the latest target data set that has a continuity with the previous target data set, use the latest target data set, and in a case where there is no latest target data set that has the temporal continuity with the previous target data set, use a prediction target data set derived based on the previous target data set as the latest target data set; and
determine, based on a frequency of use of the prediction target data set, whether or not the target associated with the target data set is an upper object overhead of the vehicle and with which the vehicle cannot collide, wherein
even if there is the latest target data set that has the continuity with the previous target data set, in a case where (i) the target is associated with the previous target data set is a stationary object in the current lane and (ii) the target associated with the latest target data set is within a predetermined threshold distance of the wall, the signal processor uses the prediction target data set instead of the latest target data set.

2. The radar apparatus according to claim 1, wherein the signal processor is further configured to:
determine that, in a case where (a) the target associated with the target data set is the stationary object that has newly appeared and (b) there is another vehicle detected within a predetermined distance in front of the target, the target is the upper object.

3. The radar apparatus according to claim 1, wherein the signal processor is further configured to:
in a case where: (1) the target associated with the target data set is the stationary object; (2) a time to collision of the host vehicle with the target is equal to or less than a threshold; and (3) there is another vehicle between the target and the host vehicle, change a condition that is used to determine whether or not the target associated with the target data set is the upper object so as to increase a probability that the target is determined as the upper object.

4. The radar apparatus according to claim 1, wherein the signal processor is further configured to:
output the target data set to a vehicle control apparatus that controls the host vehicle, wherein
in a case where the target associated with the target data set is determined as the upper object, the signal processor does not output the target data set to the vehicle control apparatus.

5. A radar apparatus that acquires a target data set of a target near a host vehicle, the radar apparatus comprising:
a signal processor configured to:
derive the target data set of the target, in a predetermined time cycle, based on a reception signal acquired by receiving a reflection wave from an environment including the target;
determine whether or not there is a temporal continuity between a previous target data set and a latest target data set, in a case where there is the latest target data set that has a continuity with the previous target data set, use the latest target data set, and in a case where there is no latest target data set that has the temporal continuity with the previous target data set, use a prediction target data set derived based on the previous target data set as the latest target data set;
determine, based on a frequency of use of the prediction target data set, whether or not the target associated with the target data set is an upper object overhead of the vehicle and with which the vehicle cannot collide, and
in a case where: (1) the target associated with the target data set is a stationary object; (2) a time to collision of the host vehicle with the target is equal to or less than a threshold; and (3) there is another vehicle detected between the target and the host vehicle, change a condition that is used to determine whether or not the target associated with target data set is the upper object, so as to increase a probability that the target is determined as the upper object.

6. The radar apparatus according to claim 5, wherein the signal processor is further configured to:
output the target data set to a vehicle control apparatus that controls the host vehicle, wherein
in a case where the target associated with the target data set is determined as the upper object, the signal processor does not output the target data set to the vehicle control apparatus.

7. A signal processing method of acquiring a target data set of a target near a host vehicle, the signal processing method comprising the steps of:
(a) a signal processor deriving the target data set of the target, in a predetermined time cycle, based on a reception signal acquired by receiving a reflection wave from an environment including the target;
(b) the signal processor detecting presence of a wall along a current lane in which the host vehicle is traveling;
(c) the signal processor determining whether or not there is a temporal continuity between a previous target data set and a latest target data set, in a case where there is the latest target data set that has a continuity with the previous target data set, use the latest target data set, and in a case where there is no latest target data set that has the continuity with the previous target data set, use a prediction target data set derived based on the previous target data set as the latest target data set; and (d) the signal processor determining, based on a frequency of use of the prediction target data set, whether or not the target associated with the target data set is an upper object overhead of the vehicle and with which the vehicle cannot collide, wherein
even if there is the latest target data set that has the continuity with the previous target data set, in a case where (i) the target is associated with the previous target data set is a stationary object in the current lane and (ii) the target associated with the latest target data set is within a predetermined threshold distance of the wall, the signal processor uses the prediction target data set instead of the latest target data set.

8. The signal processing method according to claim 7, further comprising the step of:
(e) in a case where (1) the target associated with the target data set is the stationary object that has newly appeared and (2) there is another vehicle detected within a predetermined distance in front of the target, the signal processor determining that the target is the upper object.

9. The signal processing method according to claim 7, further comprising the step of:
(f) in the case where: (1) the target associated with the target data set is the stationary object; (2) a time to collision of the host vehicle with the target is equal to or less than a threshold; and (3) there is another vehicle between the target and the host vehicle, the signal processor changing a condition that is used by the step (d), to increase a probability that the target is determined as the upper object.

10. The signal processing method according to claim 7, further comprising the step of:
(g) the signal processor outputting the target data set to a vehicle control apparatus that controls the host vehicle, wherein
in a case where the target associated with the target data set is determined as the upper object, the step (g) does not output the target data set to the vehicle control apparatus.

11. A signal processing method of acquiring a target data set of a target near a host vehicle, the signal processing method comprising the steps of:
(a) a signal processor deriving the target data set of the target, in a predetermined time cycle, based on a reception signal acquired by receiving a reflection wave from an environment including the target;
(b) the signal processor determining whether or not there is a temporal continuity between a previous target data set and a latest target data set, in a case where there is the latest target data set that has a continuity with the previous target data set, use the latest target data set, and in a case where there is no latest target data set that has the temporal continuity with the previous target data set, use a prediction target data set derived based on the previous target data set as the latest target data set;
(c) the signal processor determining based on a frequency of use of the prediction target data set whether or not the target associated with the target data set is an upper object overhead of the vehicle and with which the vehicle cannot collide, and
(d) in the case where: (1) the target associated with the target data set is a stationary object; (2) a time to collision of the host vehicle with the target is equal to or less than a threshold; and (3) there is another vehicle detected between the target and the host vehicle, the signal processor changing a condition that is used by the step (c), to increase a probability that the target is determined as the upper object.

12. The signal processing method according to claim 11, further comprising the step of:
(e) the signal processor outputting the target data set to a vehicle control apparatus that controls the host vehicle, wherein
in a case where the target associated with the target data set is determined as the upper object, the step (e) does not output the target data set to the vehicle control apparatus.

* * * * *